(12) United States Patent
Mantzel et al.

(10) Patent No.: US 10,362,205 B2
(45) Date of Patent: Jul. 23, 2019

(54) PERFORMING INTENSITY EQUALIZATION WITH RESPECT TO MONO AND COLOR IMAGES

(71) Applicant: QUALCOMM Incorporated, San Diego, CA (US)

(72) Inventors: William Mantzel, San Diego, CA (US); Ramin Rezaiifar, Del Mar, CA (US); Chiachi Sung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/268,978

(22) Filed: Sep. 19, 2016

(65) Prior Publication Data
US 2017/0318222 A1 Nov. 2, 2017

Related U.S. Application Data

(60) Provisional application No. 62/328,927, filed on Apr. 28, 2016.

(51) Int. Cl.
*G06T 3/00* (2006.01)
*G06T 7/30* (2017.01)
(Continued)

(52) U.S. Cl.
CPC ......... *H04N 5/2258* (2013.01); *G06T 3/0068* (2013.01); *G06T 7/30* (2017.01);
(Continued)

(58) Field of Classification Search
CPC .. H04N 5/2258; H04N 9/045; H04N 13/0239; H04N 9/093; H04N 13/0025;
(Continued)

(56) References Cited

U.S. PATENT DOCUMENTS

| 6,788,338 B1* | 9/2004 | Dinev | H04N 5/2258 |
| | | | 348/222.1 |
| 7,483,065 B2* | 1/2009 | Gruhlke | H04N 9/045 |
| | | | 348/216.1 |

(Continued)

FOREIGN PATENT DOCUMENTS

| CN | 105049718 A | 11/2015 |
| CN | 105578063 A | 5/2016 |

(Continued)

OTHER PUBLICATIONS

International Search Report and Written Opinion for corresponding PCT Application No. PCT/US2017/021600 dated Jun. 19, 2017, 16 pp.

(Continued)

*Primary Examiner* — Timothy J Henn
(74) *Attorney, Agent, or Firm* — Shumaker & Sieffert, P.A.

(57) ABSTRACT

In general, techniques are described that facilitate processing of color image data using both a mono image data and a color image data. A device comprising a monochrome camera, a color camera and a processor may be configured to perform the techniques. The monochrome camera may be configured to capture monochrome image data of a scene. The color camera may be configured to capture color image data of the scene. The processor may be configured to perform intensity equalization with respect to a luma component of either the color image data or the monochrome image data to correct for differences in intensity between the color camera and the monochrome camera.

28 Claims, 20 Drawing Sheets

(51) Int. Cl.
  *H04N 9/04*      (2006.01)
  *H04N 1/387*     (2006.01)
  *H04N 1/407*     (2006.01)
  *H04N 13/25*     (2018.01)
  *H04N 5/225*     (2006.01)
  *H04N 5/232*     (2006.01)
  *H04N 5/247*     (2006.01)
  *H04N 9/093*     (2006.01)
  *H04N 13/133*    (2018.01)

(52) U.S. Cl.
  CPC ....... *H04N 5/2257* (2013.01); *H04N 5/23229* (2013.01); *H04N 5/247* (2013.01); *H04N 9/093* (2013.01); *H04N 13/133* (2018.05); *H04N 13/25* (2018.05); *H04N 1/3871* (2013.01); *H04N 1/407* (2013.01); *H04N 9/045* (2013.01)

(58) Field of Classification Search
  CPC .............. H04N 13/025; H04N 5/2257; H04N 5/23229; H04N 5/247; H04N 1/407; H04N 1/3871; H04N 5/2355; G06T 3/0068; G06T 7/30
  See application file for complete search history.

(56) References Cited

U.S. PATENT DOCUMENTS

| | | | |
|---|---|---|---|
| 9,235,898 B2 | 1/2016 | Venkataraman et al. | |
| 9,241,111 B1 | 1/2016 | Baldwin | |
| 9,319,585 B1 | 4/2016 | Liu et al. | |
| 9,473,708 B1 | 10/2016 | D'Amico et al. | |
| 9,894,298 B1 | 2/2018 | Solh | |
| 2003/0048493 A1* | 3/2003 | Pontifex | H04N 5/243 358/514 |
| 2006/0093209 A1* | 5/2006 | Guetter | G06K 9/6206 382/159 |
| 2011/0064327 A1 | 3/2011 | Dagher et al. | |
| 2012/0026366 A1 | 2/2012 | Golan et al. | |
| 2013/0016251 A1 | 1/2013 | Ogasahara | |
| 2013/0044127 A1 | 2/2013 | Wu et al. | |
| 2013/0129196 A1 | 5/2013 | Paris et al. | |
| 2013/0229544 A1* | 9/2013 | Bando | H04N 9/093 348/222.1 |
| 2014/0320602 A1 | 10/2014 | Govindarao et al. | |
| 2015/0049916 A1 | 2/2015 | Ciurea et al. | |
| 2015/0078678 A1 | 3/2015 | Grandin et al. | |
| 2015/0085174 A1 | 3/2015 | Shabtay et al. | |
| 2015/0145970 A1* | 5/2015 | Kim | H04N 13/0422 348/54 |
| 2015/0278996 A1 | 10/2015 | Tsutsumi | |
| 2015/0319347 A1 | 11/2015 | Cottrell et al. | |
| 2015/0371387 A1* | 12/2015 | Atanassov | G06T 19/20 348/49 |
| 2016/0182821 A1 | 6/2016 | Shabtay et al. | |
| 2016/0337587 A1 | 11/2016 | Chou et al. | |
| 2016/0344943 A1 | 11/2016 | Lee et al. | |
| 2017/0094258 A1 | 3/2017 | Cooper | |
| 2017/0318272 A1* | 11/2017 | Mantzel | H04N 13/025 |
| 2017/0318273 A1* | 11/2017 | Mantzel | H04N 13/025 |

FOREIGN PATENT DOCUMENTS

| | | |
|---|---|---|
| WO | 2012173571 A1 | 12/2012 |
| WO | 2015139454 A1 | 9/2015 |

OTHER PUBLICATIONS

Sun N., et al., "HDR Image Construction from Multi-Exposed Stereo LOR Images", 17th IEEE International Conference on Image Processing, Hong Kong, China, IEEE, Piscataway, NJ, USA, XP031814633, Sep. 26, 2010, pp. 2973-2976, ISBN: 978-1-4244-7992-4.

Yu Q., et al., "Regularized Extreme Learning Machine for Regression with Missing Data", Neurocomputing, vol. 102, Feb. 1, 2013, XP055379666, pp. 45-51.

"Qualcomm Introduce Clear Sight Camera Technology," androidheadlines.com, retrieved from http://www.androidheadlines.com/2016/09/qualcomm-introduce-clear-sight-camera-technology.html, Sep. 14, 2016, 2 pp.

Stent, et al., "An Image-Based System for Change Detection on Tunnel Linings," Machine Vision and Applications, Apr. 2016, vol. 27, Issue 3, 4 pp.

U.S. Appl. No. 15/269,129, filed by William Mantzel, filed Sep. 19, 2016.

U.S. Appl. No. 15/269,067, filed by William Mantzel, filed Sep. 19, 2016.

Response to Written Opinion dated Jun. 19, 2017, from International Application No. PCT/US2017/021600, filed on Nov. 2, 2017, 18 pp.

Second Written Opinion from International Application No. PCT/US2017/021600, dated Apr. 15, 2018, 7 pp.

International Preliminary Report on Patentability from International Application No. PCT/US2017/021600, dated Jul. 10, 2018, 21 pp.

* cited by examiner

PERFORMING INTENSITY EQUALIZATION WITH RESPECT TO MONO AND COLOR IMAGES

This application claims the benefit of U.S. Provisional Application No. 62/328,927, entitled "COLOR IMAGE PROCESSING USING MONO AND COLOR IMAGES," filed 28 Apr. 2016, the entire contents of which are incorporated herein by reference.

TECHNICAL FIELD

This disclosure relates to image generation and more particularly to image generation using mono and color images.

BACKGROUND

Cameras may incorporate a number of processes by which to enhance color photo capture. For example, a process referred to as high dynamic range (HDR) may involve capturing two or more color photos at different exposure levels and combining the different color photos to produce what may be referred to as a single HDR photo. In other words, HDR may involve capturing different color photos of the same scene with different shutter speed and aperture combinations in order to produce a set of color photos with varying luminosity and depth of field. The camera may then post-process the set of color photos to blend the color photos together and thereby create a single HDR photo comprising the most focused, well-lit, and colorful parts of the scene.

Another exemplary process by which to enhance image capture is referred to as optical image stabilization (OIS). The OIS process may involve detecting movement of the camera (e.g., due to an operator's inherent inability to remain perfectly still when holding the camera) using sensors, such as a gyroscope. Using the OIS process, the camera may move the lens or the sensor in a manner that counteracts the detected movements of the camera, thereby potentially reducing blur and improving low light, close-up and other more difficult image capture contexts.

The OIS process may operate as a pre-process to adjust color photo capture while the HDR process may operate as a post-process to generate the HDR photo from multiple captured color photos. Both, whether used alone or in combination, may improve color photo capture.

SUMMARY

This disclosure describes example techniques by which to utilize a monochrome photo (which may be referred to as a "mono photo") captured using a monochrome camera (or "mono camera") to potentially improve a color photo captured using a color camera. Rather than rely solely on color photos during post-processing or pre-processing to improve image capture, the techniques may utilize more detailed content obtained from mono photo capture to enhance color photos that are typically captured at a lower resolution. Post-processing color photos using concurrently captured mono photos in accordance with the techniques described in this disclosure may result in color images having improved level of detail and reduced noise in comparison to other types of color photo capture enhancement processes.

In one example, a method of capturing color image data comprises capturing, by a monochrome camera of a device, monochrome image data of a scene, and capturing, by a color camera of the device, color image data of the scene. The method also comprises performing, by a processor of the device, intensity equalization with respect to a luma component of either the color image data or the monochrome image data to correct for differences in intensity between the color camera and the monochrome camera.

In another example, a device configured to capture color image data comprises a monochrome camera configured to capture monochrome image data of a scene, and a color camera configured to capture color image data of the scene. The device further comprises a processor configured to perform intensity equalization with respect to a luma component of either the color image data or the monochrome image data to correct for differences in intensity between the color camera and the monochrome camera.

In another example, a device configured to capture color image data comprises means for capturing monochrome image data of a scene, and means for capturing color image data of the scene. The device further comprises means for performing intensity equalization with respect to a luma component of either the color image data or the monochrome image data to correct for differences in intensity between the means for capturing the color image data and the means for capturing the monochrome image data.

In another example, a non-transitory computer-readable storage medium has stored thereon instructions that, when executed, cause one or more processors to interface with a monochrome camera to initiate capture of monochrome image data of a scene, interface with a color camera to initiate capture of color image data of the scene, and perform intensity equalization with respect to a luma component of either the color image data or the monochrome image data to correct for differences in intensity between the color camera and the monochrome camera.

In another example, a method of capturing color image data comprises capturing, by a monochrome camera of a device, monochrome image data of a scene, and capturing, by a color camera of the device, color image data of the scene. The method further comprises matching, by a processor of the device, features of the color image data to features of the monochrome image data, and computing, by the processor, a finite number of shift values based on the matched features of the color image data and the monochrome image data, the finite number of shift values mapping pixels of the color image data to pixels of the monochrome image data. The method also comprises shifting, by the processor, the color image data based on the finite number of shift values to generate enhanced color image data.

In another example, a device configured to capture color image data comprises a monochrome camera configured to capture monochrome image data of a scene, and a color camera configured to capture color image data of the scene. The device further comprises a processor configured to match features of the color image data to features of the monochrome image data, and compute a finite number of shift values based on the matched features of the color image data and the monochrome image data, the finite number of shift values mapping pixels of the color image data to pixels of the monochrome image data. The processor further configured to shift the color image data based on the finite number of shift values to generate enhanced color image data.

In another example, a device configured to capture color image data comprises means for capturing monochrome image data of a scene, and means for capturing color image data of the scene. The device further comprises means for matching features of the color image data to features of the monochrome image data, and means for computing a finite number of shift values based on the matched features of the color image data and the monochrome image data, the finite number of shift values mapping pixels of the color image data to pixels of the monochrome image data. The device also comprises means for shifting the color image data based on the finite number of shift values to generate enhanced color image data.

In another example, a non-transitory computer-readable medium has stored thereon instructions that, when executed, cause one or more processors of a device to interface with a monochrome camera to capture monochrome image data of a scene, interface with a color camera to capture color image data of the scene, match features of the color image data to features of the monochrome image data, compute a finite number of shift values based on the matched features of the color image data and the monochrome image data, the finite number of shift values mapping pixels of the color image data to pixels of the monochrome image data, and shift the color image data based on the finite number of shift values to generate enhanced color image data.

In another example, a method of capturing color image data comprises capturing, by a monochrome camera of a device, monochrome image data of a scene, and capturing, by a color camera of the device, color image data of the scene. The method also comprises determining, by a processor of the device, a parallax value indicative of a level of parallax between the monochrome image data and the color image data, and determining, by the processor, that the parallax value is greater than a parallax threshold. The method further comprises combining, by the processor and in response to the determination that the parallax value is greater than the parallax threshold, a luma component of the color image data with a luma component of the monochrome image data to generate a luma component of enhanced color image data.

In another example, a device configured to capture color image data comprises a monochrome camera configured to capture monochrome image data of a scene, and a color camera configured to capture color image data of the scene. The device further comprises a processor configured to determine a parallax value indicative of a level of parallax between the monochrome image data and the color image data, and determine that the parallax is greater than the parallax threshold. The processor also configured to combine, in response to the determination that the parallax is greater than the parallax threshold, a luma component of the color image data with a luma component of the monochrome image data to generate a luma component of enhanced color image data.

In another example, a device configured to capture color image data comprises means for capturing monochrome image data of a scene, and means for capturing color image data of the scene. The device also comprises means for determining parallax between the monochrome image data and the color image data, and means for determining that the parallax is greater than a parallax threshold. The device further comprises means for combining, in response to the determination the parallax is greater than the parallax threshold, a luma component of the color image data with a luma component of the monochrome image data to generate a luma component of enhanced color image data.

In another example, a non-transitory computer-readable storage medium has stored thereon instructions that, when executed, cause one or more processors of a device to interface with a monochrome camera to capture monochrome image data of a scene, interface with a color camera to capture color image data of the scene, determine parallax between the monochrome image data and the color image data, determine that the parallax is greater than a parallax threshold, and combine, in response to the determination that the scene was captured using macrophotography, a luma component of the color image data with a luma component of the monochrome image data to generate a luma component of enhanced color image data.

The details of one or more examples are set forth in the accompanying drawings and the description below. Other features, objects, and advantages will be apparent from the description, drawings, and claims.

DETAILED DESCRIPTION

Figure 1:
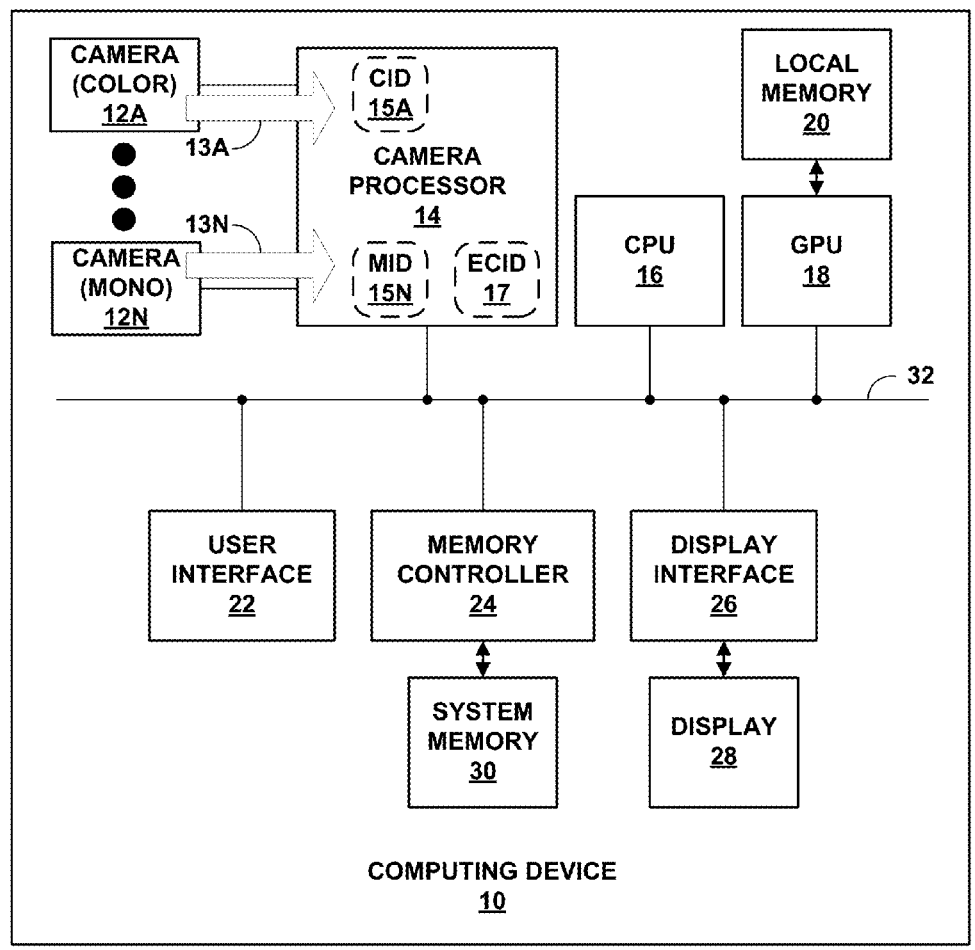
FIG. 1 is a block diagram of a device for image processing configured to perform one or more example techniques described in this disclosure.

Color cameras may include a color filter array (CFA) that arranges red-green-blue (RGB) color filters on a square grid of photo-sensors. A popular CFA referred to as a "Bayer filter" may recursively arrange green filters, red filters, and blue filters on the photo-sensors in a pattern that provides approximately for 50% green filters, 25% red filters, and 25% blue filters. The use of twice as many green filters as either red filters or blue filters may mimic the physiology of the human eye. Although described in the context of RGB color space or derivatives thereof (such as YUV or Y'UV color spaces), the techniques may be performed in the context of other color spaces used capture or process color photos, such as the cyan-magenta-yellow (CMY) color space.

The use of the Bayer filters, however, results in an image that has lower level of detail (a.k.a. resolution) compared to a mono sensor with no color filter. This is due, in part, to de-mosaicking being a form of interpolation where the values of two out of three values for red (R), green (G), and blue (B) for each pixel is estimated using the nearby pixels. Also, color filters block some of the light that hits the sensor and lower light level typically translates to higher noise level. A mono photo-sensor bank, by virtue of being directed to solely to the capture of luminance (or "luma"), may provide a higher resolution mono photo in comparison to a same sized color photo-sensor bank. Furthermore, because the mono camera does not utilize any color filters, the mono photos may have, in addition to a higher resolution, a higher clarity than color photos due to the lack of any need to perform de-mosaicking to combine multiple outputs from differently color filtered photo-sensors.

The techniques described in this disclosure utilize a monochrome photo (which may be referred to as a "mono photo") captured using a monochrome camera (or "mono camera") to potentially improve a color photo captured using a color camera. Rather than rely solely on color photos during post-processing or pre-processes to improve image capture, the techniques may utilize more detailed mono photo capture to enhance color photos that are typically captured at a lower resolution. Post-processing color photos using concurrently captured mono photos in accordance with the techniques described in this disclosure may result in color images having improved clarity and reduced noise in comparison to other color photos capturing using other color photo only enhancement processes.

When the primary camera utilizes a Bayer (color) sensor and the secondary camera is a mono (black-and-white, or grayscale) sensor, the secondary mono sensor has the potential to improve the noise level and clarity of the first color sensor for two main reasons:

1) The mono sensor may not filter incoming light and thereby may measure the incoming light at a higher signal-to-noise ratio (SNR) than the primary color sensor; and
2) The mono sensor may not perform demosaicing and thereby may not suffer any loss of resolution that might otherwise result from demosaicing.

The techniques may therefore attempt to output a fused image that is similar to the input color image produced using the primary color sensor, but with a Y channel (grayscale) component that may be similar to the mono image in terms of improved noise and sharpness.

Fusing images from two separate cameras may present challenges. First, the primary and secondary cameras are necessarily offset from one another (e.g., either vertically or horizontally), which may introduce a parallax effect during fusion of the color and mono photos. Second, the primary and secondary cameras may have different sensor characteristics, which may result in differences in capture of the common Y channel (grayscale).

Various aspects of the techniques described in this disclosure relate to correcting or at least mitigating the parallax introduced by using two separate cameras. In addition, various aspects of the techniques described in this disclosure relate to equalizing the Y channel of Bayer and mono sensor capture to potentially preserve luminance and color constancy.

These techniques may first register the color photo to the mono photo, and next determine whether the scene of the color and mono photos are macro (e.g., having relatively large parallax) or non-macro (e.g., having relatively small parallax). For macro scenes, the camera may output a photo having the color directly from the color photo and the luminance (Y channel) as a weighted sum of the input Y channels from the color photo and the mono photo. For non-macro scenes, the camera may output a photo having the luminance directly from the mono photo and the color (U and V channels) as a weighted sum of the input U and V channels from shifted versions of the color photo.

In some instances, the techniques may employ multi-frame averaging on a series of input color photos to produce a single color photo with potentially reduced noise. The techniques may further employ, in this instance, multi-frame averaging on a series of input mono photos to produce a single mono photo. The camera may then employ the techniques described above with respect to the single color photo and the single mono photo.

FIG. 1 is a block diagram of a device for image processing configured to perform one or more example techniques described in this disclosure. Examples of device 10 include a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a standalone camera, a television, a television set-top box, a server, an intermediate network device, a mainframe computer or any other type of device that includes a camera to capture photos or other types of image data.

As illustrated in the example of FIG. 1, device 10 includes a plurality of cameras 12A-12N (e.g., four cameras or nine cameras as two examples), at least one camera processor 14, a central processing unit (CPU) 16, a graphical processing unit (GPU) 18 and local memory 20 of GPU 18, user interface 22, memory controller 24 that provides access to system memory 30, and display interface 26 that outputs signals that cause graphical data to be displayed on display 28.

Also, although the various components are illustrated as separate components, in some examples the components may be combined to form a system on chip (SoC). As an example, camera processor 14, CPU 16, GPU 18, and display interface 26 may be formed on a common chip. In some examples, one or more of camera processor 14, CPU 16, GPU 18, and display interface 26 may be in separate chips.

The various components illustrated in FIG. 1 may be formed in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 22. Bus 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

As illustrated, device 10 includes cameras 12A-12N. Cameras 12A-12N need not necessarily be part of device 10 and may be external to device 10. In such examples, camera processor 14 may similarly be external to device 10; however, it may be possible for camera processor 14 to be internal to device 10 in such examples. For ease of description, the examples are described with respect to cameras 12A-12N and camera processor 14 being part of device 10 (e.g., such as in examples where device 10 is a mobile device such as a smartphone, tablet computer, handset, mobile communication handset, or the like).

Cameras 12A-12N as used in this disclosure refer to separate sets of pixels (e.g., camera 12A includes a first set of pixels, camera 12B includes a second set of pixels, and so forth). In some examples, each one of cameras 12A-12N may be considered as including a plurality of sensors, and each sensor includes a plurality of pixels. For example, each sensor includes three pixels (e.g., a pixel for red, a pixel for green, and a pixel for blue). As another example, each sensor includes four pixels (e.g., a pixel for red, two pixels for green used to determine the green intensity and overall luminance, a pixel for blue as arranged with a Bayer filter). Even in examples where cameras 12A-12N include a plurality of sensors that include a plurality of pixels, cameras 12A-12N each include a plurality of pixels. Other naming conventions may be used. For example, device 10 may be considered as including one camera, and cameras 12A-12N are respectively called sensors instead of cameras or sub-cameras. The techniques described in this disclosure are applicable to all of these examples.

Regardless of the specific naming convention, each of cameras 12A-12N may capture image content to generate one image. Each one of these images may be combined to generate a higher resolution image. However, in some examples, there may be sufficient resolution from any one of the images captured by cameras 12A-12N for display.

Each one of cameras 12A-12N may include its own aperture and lens. However, the techniques are not so limited. In some examples, there may be a common aperture and/or lens for cameras 12A-12N and an optical splitter and waveguide that transmits the captured light to respective ones of 12A-12N. Other configurations are possible and contemplated by the techniques described in this disclosure.

The pixels of cameras 12A-12N should not be confused with image pixels. Image pixel is the term used to define a single "dot" on the generated image from the content captured by cameras 12A-12N. For example, the image generated based on the content captured by any one of cameras 12A-12N includes a determined number of pixels (e.g., megapixels).

However, the pixels of cameras 12A-12N are the actual photosensor elements having photoconductivity (e.g., the elements that capture light particles in the viewing spectrum or outside the viewing spectrum). The pixels of cameras 12A-12N conduct electricity based on intensity of the light energy (e.g., infrared or visible light) striking the surface of the pixels. The pixels may be formed with germanium, gallium, selenium, silicon with dopants, or certain metal oxides and sulfides, as a few non-limiting examples.

In some examples, the pixels of cameras 12A-12N may be covered with red-green-blue (RGB) color filters in accordance with a Bayer filter. With Bayer filtering, each of the pixels may receive light energy for a particular color component (e.g., red, green, or blue). Accordingly, the current generated by each pixel is indicative of the intensity of red, green, or blue color components in the captured light.

Camera processor 14 is configured to receive the electrical currents from respective pixels of cameras 12A-12N and process the electrical currents to generate an image. Although one camera processor 14 is illustrated, in some examples, there may be a plurality of camera processors (e.g., one per cameras 12A-12N). Accordingly, in some examples, there may be one or more camera processors like camera processor 14 in device 10.

In some examples, camera processor 14 may be configured as a single-input-multiple-data (SIMD) architecture. Camera processor 14 may perform the same operations on current received from each of the pixels on each of cameras 12A-12N. Each lane of the SIMD architecture includes an image pipeline. The image pipeline includes hardwire circuitry and/or programmable circuitry to process the output of the pixels.

For example, each image pipeline camera processor 14 may include respective trans-impedance amplifiers (TIAs) to convert the current to a voltage and respective analog-to-digital converters (ADCs) that convert the analog voltage output into a digital value. In the example of the visible spectrum, because the current outputted by each pixel indicates the intensity of a red, green, or blue component, the digital values from three pixels of one of cameras 12A-12N (e.g., digital values from one sensor that includes three or four pixels) can be used to generate one image pixel.

In addition to converting analog current outputs to digital values, camera processor 14 may perform some additional post-processing to increase the quality of the final image. For example, camera processor 14 may evaluate the color and brightness data of neighboring image pixels and perform demosaicing to update the color and brightness of the image pixel. Camera processor 14 may also perform noise reduction and image sharpening, as additional examples. Camera processor 14 outputs the resulting images (e.g., pixel values for each of the image pixels) to system memory 30 via memory controller 24.

CPU 16 may comprise a general-purpose or a special-purpose processor that controls operation of device 10. A user may provide input to computing device 10 to cause CPU 16 to execute one or more software applications. The software applications that execute on CPU 16 may include, for example, an operating system, a word processor application, an email application, a spread sheet application, a media player application, a video game application, a graphical user interface application or another program. The user may provide input to computing device 10 via one or more input devices (not shown) such as a keyboard, a mouse, a microphone, a touch pad or another input device that is coupled to computing device 10 via user input interface 22.

As one example, the user may execute an application to capture an image. The application may present real-time image content on display 28 for the user to view prior to taking an image. In some examples, the real-time image content displayed on display 28 may be the content from one of cameras 12A-12N. The code for the application used to capture image may be stored on system memory 30 and CPU 16 may retrieve and execute the object code for the application or retrieve and compile source code to obtain object code, which CPU 16 may execute to present the application.

When the user is satisfied with the real-time image content, the user may interact with user interface 22 (which may be a graphical button displayed on display 28) to capture the image content. In response, one or more cameras 12A-12N may capture image content and camera processor 14 may process the received image content to generate a plurality of images. In some examples, rather than cameras 12A-12N capturing images in all cases, the application executing on CPU 16 may output via display 28 an option for the user to select high resolution image generation. In response, each one of cameras 12A-12N would capture images. If high resolution image generation is not selected, one of cameras 12A-12N captures image content. Alternatively, all cameras 12A-12N may capture images in all instances. However, camera processor 14 may not process the resulting content from all cameras 12A-12N in all instances.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 34 is illustrated in the example computing device 10 of FIG. 1 as being a processing module that is separate from both CPU 16 and system memory 30, in other examples, some or all of the functionality of memory controller 24 may be implemented on one or both of CPU 46 and system memory 30.

System memory 30 may store program modules and/or instructions and/or data that are accessible by camera processor 14, CPU 16, and GPU 18. For example, system memory 30 may store user applications, resulting images from camera processor 14, intermediate data, and the like. System memory 30 may additionally store information for use by and/or generated by other components of computing device 10. For example, system memory 30 may act as a device memory for camera processor 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 30 may include instructions that cause camera processor 14, CPU 16, GPU 18, and display interface 26 to perform the functions ascribed to these components in this disclosure. Accordingly, system memory 30 may represent a computer-readable storage medium having instructions stored thereon that, when executed, cause one or more processors (e.g., camera processor 14, CPU 16, GPU 18, and display interface 26) to perform various aspects of the techniques described in this disclosure.

In some examples, system memory 30 may represent a non-transitory computer-readable storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from device 10, and moved to another device. As another example, memory, substantially similar to system memory 30, may be inserted into device 10. In certain examples, a non-transitory storage medium may store data that can, over time, change (e.g., in RAM).

Camera processor 14, CPU 16, and GPU 18 may store image data, and the like in respective buffers that are allocated within system memory 30. Display interface 26 may retrieve the data from system memory 30 and configure display 28 to display the image represented by the rendered image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Display 28 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset or a tablet computer. Alternatively, display 28 may be a stand-alone device coupled to computing device 10 via a wired or wireless communications link. For instance, display 28 may be a computer monitor or flat panel display connected to a personal computer via a cable or wireless link.

In accordance with the techniques described in this disclosure, computing device 10 may enhance a color image data (which may also be interchangeably referred to as a "color photo" or "color image") based on a monochrome (which may be shortened to "mono") image data captured concurrent to the capture of the color image data. In the example of FIG. 1, camera 12A is assumed to represent a color camera 12A, while camera 12N is assumed to represent a mono camera 12N. As such, computing device 10 may include both a color camera 12A and a mono camera 12N. Color camera 12A may be displaced (e.g., horizontally displaced or vertically displaced) physically within the housing of computing device 10 from mono camera 12N.

In operation, mono camera 12N of computing device 10 may capture a mono photo (where again the term "photo" may refer to "image data") of a scene. Color camera 12A may capture color image data 13A of the same scene concurrent with the capture of monochrome image data 13N by monochrome camera 12N. Camera processor 14 may coordinate the concurrent capture of color image data 13A and mono image data 13N by interfacing with each of color camera 12A and mono camera 12N concurrently to capture the scene at approximately the same time (which may not be exactly the same time due to signal latency, processing latency, or other types of latencies or delays but should be sufficiently close in time so as to capture substantially the same scene).

In some instances, camera processor 14 may initiate the capture of multiple different color image data 13A and/or multiple different mono image data 13N over a period of time and perform so-called frame averaging or other summation techniques to produce an image from multiple images captured over a short period of time. Camera processor 14 may process multiple different color image data 13A and/or multiple different mono image data 13N to generate a single combined color image data 15A ("CID 15A") and/or a single combined mono image data 15N ("MID 15N"). In particular, CID 15A may include pixels of a color image, such that processor 14 may shift values of the pixels of CID 15A. Camera processor 14 may, for example, average the corresponding pixel values for each pixel specified in multiple different color image data 13A on a pixel-by-pixel basis to generate single combined color image data 15A. Likewise, camera processor 14 may average the corresponding pixel values for each pixel specified in multiple different mono image data 13N on a pixel-by-pixel basis to generate single combined mono image data 15N.

Camera processor 14 may utilize single combined color image data 15A and/or single combined color image data 15N in place of single color image data 13A and/or single mono image data 13N noted above in the various aspects of the techniques described in this disclosure. Although camera processor 14 may operate with respect to any combination of single color image data 13A, single mono image data 13N, single combined color image data 15A, and single combined mono image data 15N, camera processor 14 is described below, for ease of illustration purposes, as operating with respect to single combined color image data 15A and single combined mono image data 15N except for when discussing the photographic results of utilizing single color image data 13A and single mono image data 13N.

In any event, camera processor 14 processes combined color image data 15A based on combined mono image data 15N to generate enhanced color image data 17 ("ECID 17"). The overall operation of camera processor 14 in processing combined color image data 15A based on combined mono image data 15N is described in more detail with respect to FIGS. 2-11.

Figure 2:
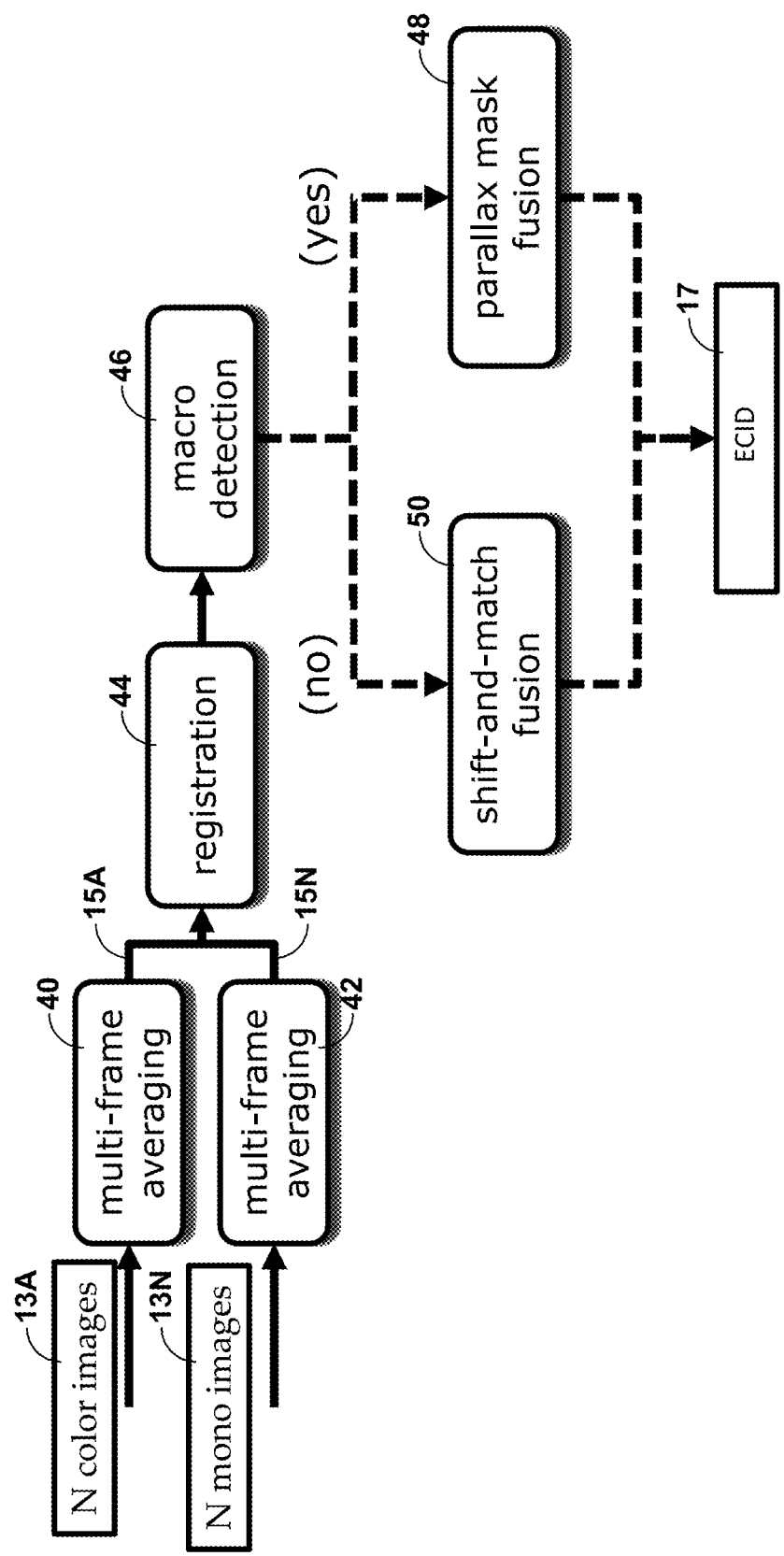
FIG. 2 is a flowchart illustrating exemplary operation of the device of FIG. 1 in performing various aspects of the color image data enhancement techniques described in this disclosure.

FIG. 2 is a flowchart illustrating exemplary operation of computing device 10 in performing various aspects of the color image data enhancement techniques described in this disclosure. As shown in the example of FIG. 2, camera processor 14 of computing device 10 may receive a variable number (denoted as "N") of different color images 13A (with "images" referring to "image data") from color camera 12A and N different mono images 13N from mono image 15N. Camera processor 14 may perform multi-frame averaging with respect to color images 13A to generate combined color image 15A (40) and with respect to mono images 13N to generate combined mono images 15N (42).

In processing combined color image data 15A to generate enhanced color image data 17, camera processor 14 may first register combined color image data 15A and combined mono image data 15N (44). Registration may involve extraction of features from each of combined color image data 15A and combined mono image data 15N and comparison of the features from each of combined color image data 15A and combined mono image data 15N in order to spatially align each of combined color image data 15A and mono image data 15N. Camera processor 14 may also perform registration with respect to intensities rather than features.

Figure 3:
FIG. 3 is a diagram showing a combined color image super imposed over a combined mono image.

FIG. 3 is a diagram showing combined color image 15A super imposed over combined mono image 15N. In the example of FIG. 3, there is a baseline between the two cameras 12A and 12N. However, images 15A and 15N may need to be registered first.

Figure 4:
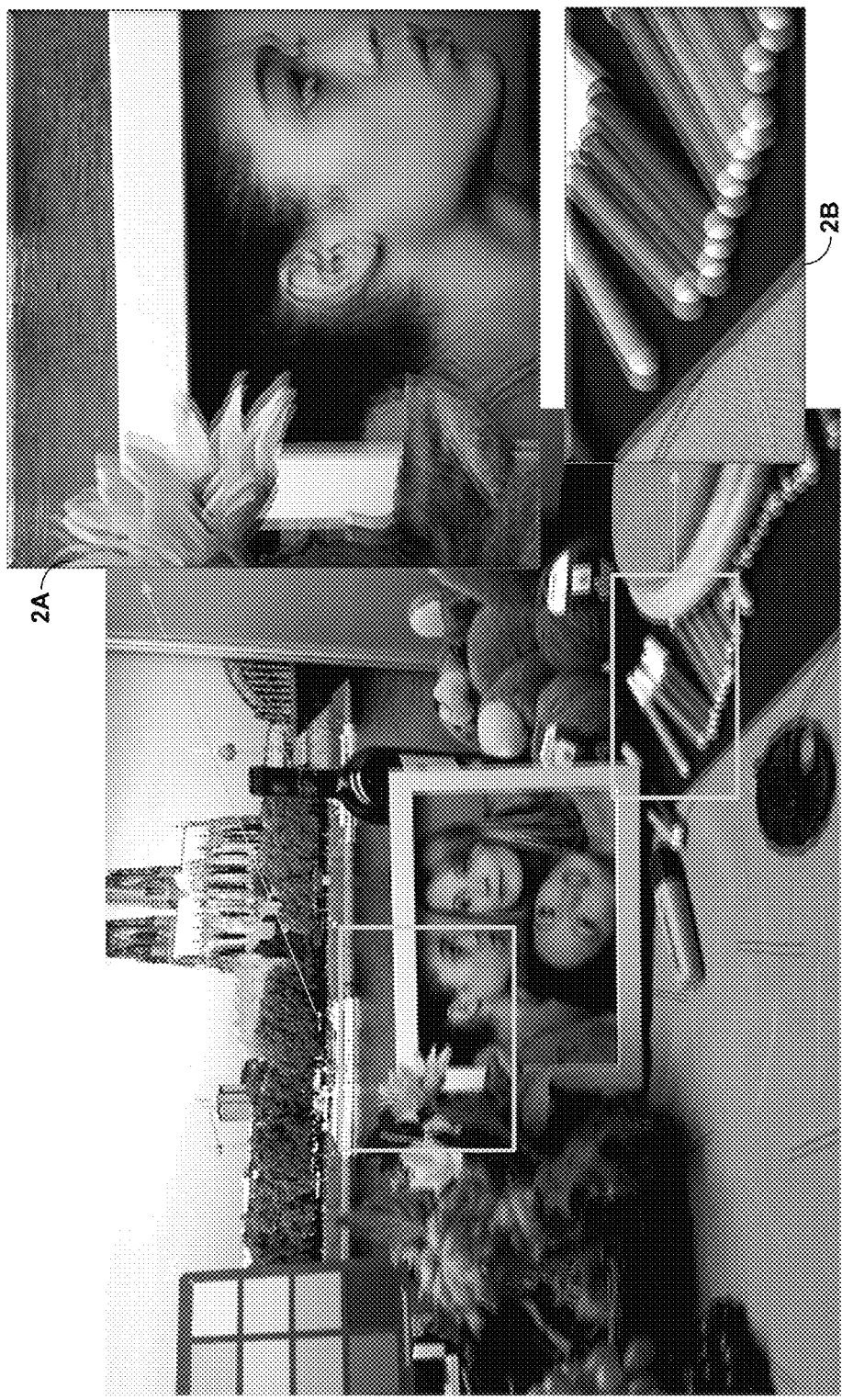
FIG. 4 is a diagram showing a combined color image super imposed over a mono image after each of the combined color image and the mono image have undergone registration.

FIG. 4 is a diagram showing combined color image 15A super imposed over mono image 15N after combined color image 15A and mono image 15N have undergone registration. In the example of FIG. 4, combined color image 15A is still offset from mono image 15N due to parallax resulting from the displacement between color camera 12A and mono camera 12N within the housing of computing device 10. In performing registration, camera processor 14 may correct for such displacement but fail to correct for parallax resulting from the slightly different perspectives of color camera 12A relative to mono camera 12N.

The parallax is evident when considering portions 2A and 2B of resulting super imposed image created by super imposing images 15A and 15N. The parallax manifests itself as blurred edges in portion 2A, such as the blurred edges of the flower and the edges of profile of the woman. In portion 2B, the parallax is evident by the overlapping edges in the markers.

Returning to FIG. 2, camera processor 14 may, after registering combined color image 15A with mono image 15N, perform macro detection to determine whether the scene of combined color image 15A and combined mono image 15N were captured using macrophotography (e.g., using a so-called "macro mode") (46). Macro detection is described in more detail with respect to FIG. 5. Macro detection may indicate whether an image of an object was captured at close range (macro) such that parallax is relatively higher, or at a further distance (non-macro) at which parallax is relatively lower. When the scene was captured using macrophotography ("YES" 46), camera processor 14 may perform parallax mask fusion to generate enhanced color image data 17 based on mono image data 15N (48), which is described in more detail with respect to FIGS. 6 and 7. When the scene was not captured using macrophotography ("NO" 46), camera processor 15 may perform shift-and-match fusion to generate enhanced color image data 17 based on mono image data 15N (50), which is described in more detail with respect to FIGS. 8 and 9.

Figure 5:
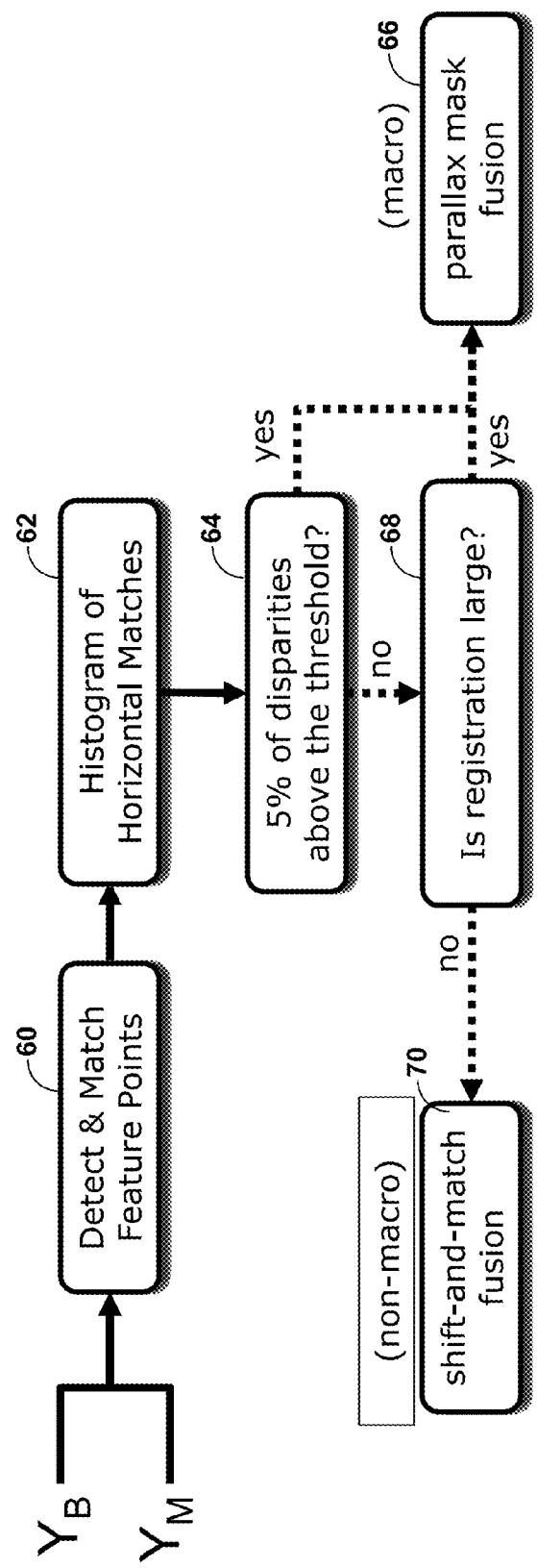
FIG. 5 is a flowchart illustrating exemplary operation of the camera processor shown in FIG. 1 in performing macro detection in accordance with various aspects of the techniques described in this disclosure.

FIG. 5 is a flowchart illustrating exemplary operation of camera processor 14 in performing macro detection in accordance with various aspects of the techniques described in this disclosure. In the example of FIG. 5, camera processor 14 may determine a parallax value indicative of a level of parallax between mono image data 15N (denoted as $Y_M$, where Y denotes a luminance (luma) component of mono image data 15N and M denotes mono) and color image data 15A (denoted as $Y_B$, where Y denotes a luma component of color image data 15A and B denotes Bayer in reference to the Bayer filter used to capture color image data 15A).

To determine the parallax value indicative of the level of parallax between mono image data 15N and color image data 15A, camera processor 14 may first detect and match feature points (which may also be referred to as features) or alternatively use the features detected during registration (60). Camera processor 14 may then compare the features (which may be stored as histograms) to identify horizontal matches and thereby determine the parallax value indicative of the level of parallax remaining after registration (62). Camera processor 14 may identify horizontal matches when color camera 12A and mono camera 12N are displaced horizontally from one another.

Although described with respect to horizontally displaced cameras 12A and 12N, the techniques may be performed with respect to any other form of displacement (e.g., vertical or combinations of vertical and horizontal). With regard to these other forms of displacement, camera processor 14 may identify vertical matches or combinations of vertical and horizontal matches to determine the parallax value.

Camera processor 14 may next determine whether the scene was captured using macrophotography based on the determined parallax value. Camera processor 14 may determine whether the scene was captured using macrophotography when the parallax value is greater than a parallax threshold (e.g., when five percent of the disparities between the horizontally matching histograms are above the parallax threshold) (64). In response to the determination that the scene was captured using macrophotography ("YES" 64), camera processor 14 may process combined color image 15A by performing so-called "parallax mask fusion" (66), which is described in more detail with respect to FIGS. 6 and 7.

In response to the determination that the scene was not captured using macrophotography ("NO" 64), camera processor 14 may next determine whether registration was large (meaning there was a large shift, e.g., in x and/or y dimensions, to match up features during registration of combined mono image 15N with combined color image 15A) (68). When registration was large ("YES" 68), camera processor 66 may process combined color image 15A by performing so-called "parallax mask fusion" (66). When registration is not large ("NO" 68), camera processor 66 may process combined color image 15A by performing so-called "shift-and-match fusion" (70), which is described in more detail with respect to FIGS. 8 and 9.

Figure 6:
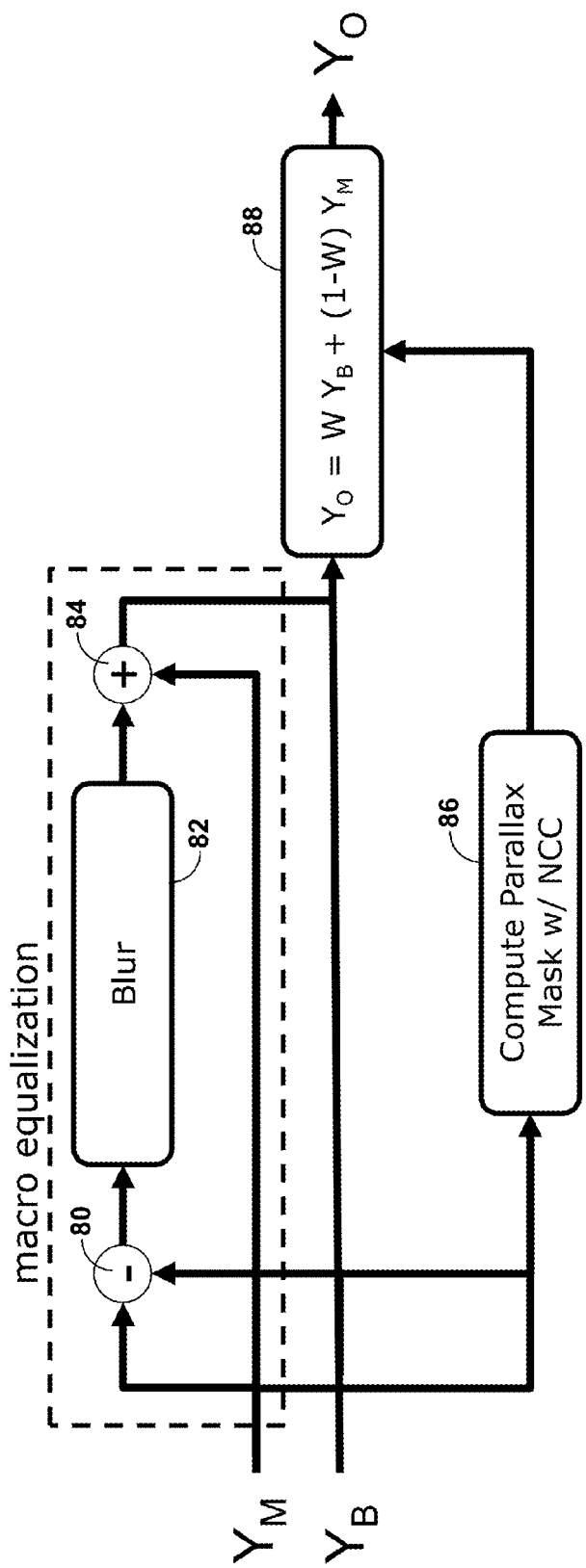
FIG. 6 is a flowchart illustrating exemplary operation of the camera processor shown in FIG. 1 in performing parallax mask fusion in accordance with various aspects of the techniques described in this disclosure.

FIG. 6 is a flowchart illustrating exemplary operation of camera processor 14 in performing parallax mask fusion in accordance with various aspects of the techniques described in this disclosure. Generally, parallax mask fusion uses, in the resulting image, the chroma component (i.e., the U and V channels in the example of the YUV color space) of combined color image 15A, while fusing the registered and equalized luma components of combined image 15A and combined mono image 15N.

As shown in the example of FIG. 6, camera processor 14 may first subtract the luma component of combined color image 15A (shown as "$Y_B$") from the luma component of combined mono image 15N (shown as "$Y_M$") (80). Camera processor 14 may next blur the result of the subtraction and add the luma component of combined mono image 15N back to the blurred result of the subtraction to effectively perform macro equalization (82, 84).

Camera processor 14 may also compute a parallax mask with normalized cross correlation (NCC) or any other form of matching process (86). NCC is described in more detail with respect to the example of FIG. 7.

Camera processor 14 may then compute the luma component of enhanced color image 17 (shown as "$Y_O$" with Y referring to the luma component and O referring to output) by combining the luma component of combined color image 15A with the equalized luma component of combined mono image 15N to generate the luma component of enhanced image 17. Camera processor 14 may combine the luma component of combined color image 15A with the equalized luma component of combined mono image 15N by performing a weighted average of the luma component of combined color image 15A and the luma component of combined mono image 15N, where W denotes the weight assigned by the parallax mask (88). The parallax mask may specify the weights on a pixel-by-pixel basis using NCC as described in more detail with respect to the example of FIG. 7.

Figure 7:
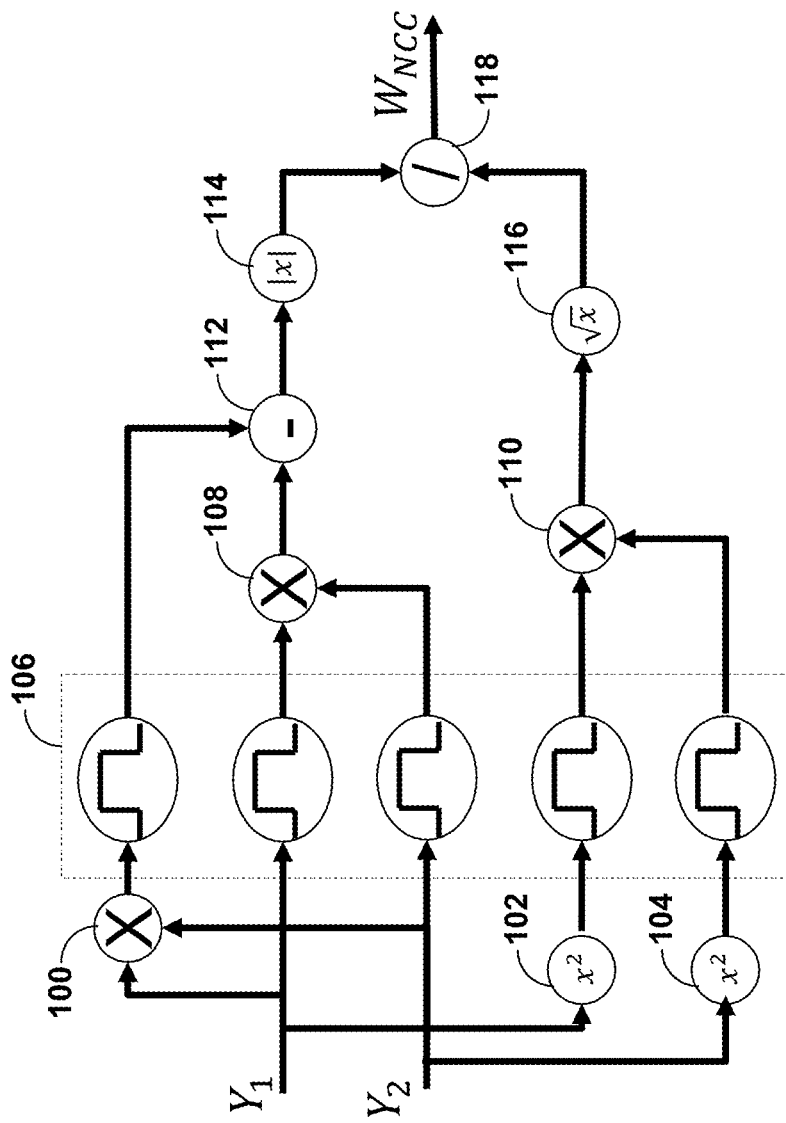
FIG. 7 is a flowchart illustrating exemplary operation of the camera processor shown in FIG. 1 in performing normalized cross correlation (NCC) in accordance with various aspects of the techniques described in this disclosure.

FIG. 7 is a flowchart illustrating exemplary operation of camera processor 14 in performing normalized cross correlation (NCC) in accordance with various aspects of the techniques described in this disclosure. As shown in the example of FIG. 7, camera processor 14 may process a pixel of the luma component of combined color image 15A (denoted as "$Y_1$") and a correspondingly positioned pixel of the luma component of combined mono image 15N (denoted as "$Y_2$"). Camera processor 14 may multiple $Y_1$ by $Y_2$ to generate $Y_{pre-1 \times 2}$ (100) (where "pre" denotes that the multiplication occurred prior to box car filtering). Camera processor 14 may also multiply $Y_1$ by $Y_1$ (shown as "$x^2$") (102) to generate $Y_{1 \times 1}$, while also multiplying $Y_2$ by $Y_2$ (shown as "$x^2$") (104) to generate $Y_{2 \times 2}$ (104).

Camera processor 14 may next box car filter $Y_{1 \times 2}$, $Y_1$, $Y_2$, $Y_{1 \times 1}$, and $Y_{2 \times 2}$ (106). In some instances, camera processor 14 may downsample during boxcar filtering to leverage low-frequency output and to reduce run-time. After applying the box car filters, camera processor 14 may multiply box car filtered $Y_1$ by box car filtered $Y_2$ to generate box car filtered $Y_{post-1 \times 2}$ (where "post" denotes that the multiplication occurred after application of the box car filtering) (108). Camera processor 14 may also multiply box car filtered $Y_{1 \times 1}$ by box car filtered $Y_{2 \times 2}$ to generate box car filtered $Y_{1 \times 1 \times 2 \times 2}$ (110).

Camera processor 14 may further subtract box car filtered $Y_{pre-1 \times 2}$ from box car filtered $Y_{post-1 \times 2}$ to generate $Y_{A1 \times 2}$ (112). Camera processor 14 may next compute the absolute value of $Y_{A1 \times 2}$ (114). Camera processor 14 may also compute the square root of box car filtered $Y_{1 \times 1 \times 2 \times 2}$ (116). Camera processor 14 may compute the weight using normalized cross correlation (NCC) (shown as $W_{NCC}$) for the pixel by dividing the absolute value of $Y_{A1 \times 2}$ by the square root of box car filtered $Y_{1 \times 1 \times 2 \times 2}$ (118). Camera processor 14 may iterate with respect to each pixel in this manner until all of the pixels have associated weights defined in the parallax mask.

Figure 8:
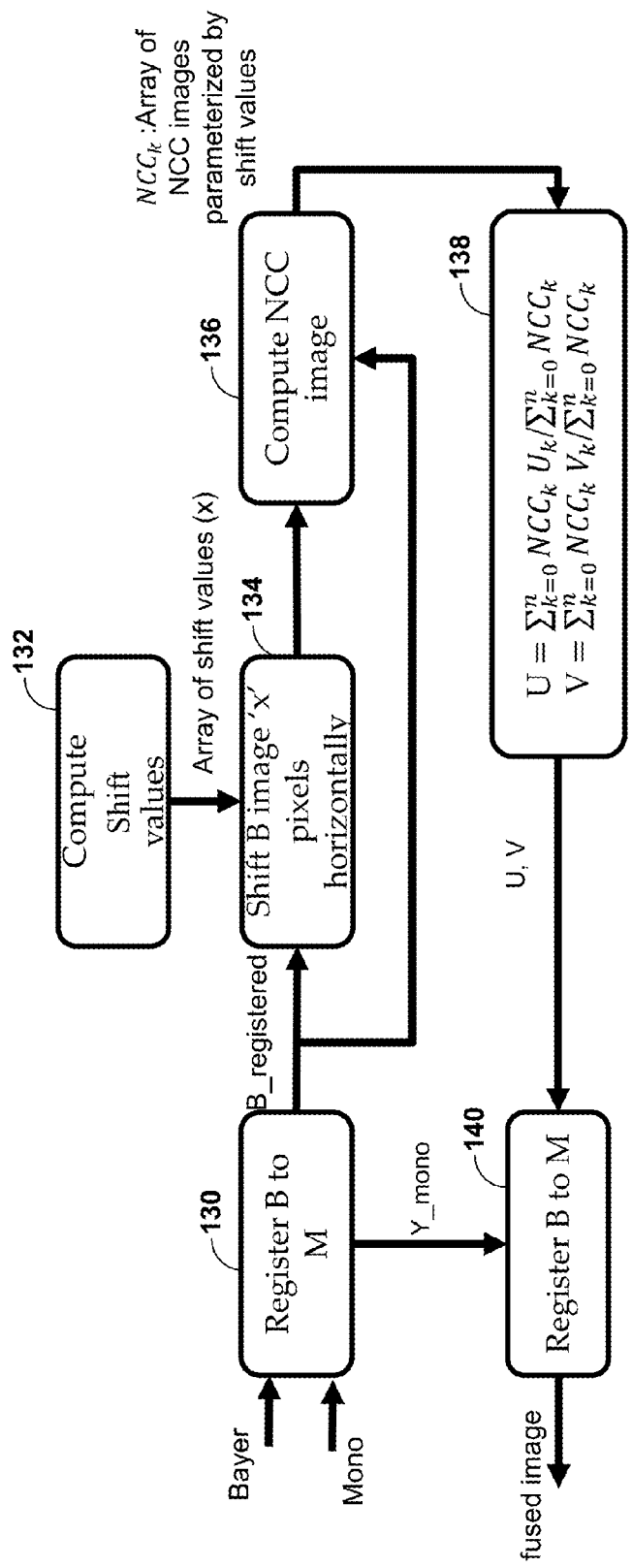
FIG. 8 is a flowchart illustrating exemplary operation of the camera processor shown in FIG. 1 in performing shift-and-match fusion in accordance with various aspects of the techniques described in this disclosure.

FIG. 8 is a flowchart illustration exemplary operation of camera processor 14 in performing shift-and-match fusion in accordance with various aspects of the techniques described in this disclosure. As shown in the example of FIG. 8, camera processor 14 may register combined color image 15A (denoted as "Bayer" or "B") to combined mono image 15N (denoted as "Mono" or "M") (130). Camera processor 14 may next compute shift values, as described in more detail with respect to FIG. 9 (132). Camera processor 14 may output the shift values as an array of shift values, each shift value specified to shift a variable (x) number of pixels horizontally.

Camera processor 14 may shift registered combined color image 15A by 'x' pixels horizontally (134) and compute an NCC image in the manner described above based on combined color image 15A and the shifted version of combined color image 15A (136). Next, camera processor 14 may determine the chroma component (which are denoted as "U" and "V" in the YUV color space) of enhanced color image 17 in accordance with the following equations (138):

$$U = \Sigma_{k=0}{}^n NCC_k U_k / \Sigma_{k=0}{}^n NCC_k; \text{ and}$$

$$V = \Sigma_{k=0}{}^n NCC_k V_k / \Sigma_{k=0}{}^n NCC_k.$$

Camera processor 14 may then register the chroma component of enhanced color image 17 to the luma component of combined mono image 15N to generate the fused image (which is another way by which to refer to enhanced color image 17) (140).

In this respect, the techniques may configure camera processor to set, in response to the determination that the scene was not captured using macrophotography, a chroma component of enhanced image data 17 equal to the chroma component of the color image data. As such, the techniques may potentially remove parallax from combined color image 15A so that combined mono image 15N can be "painted" with the parallax-free version of combined color image 15A to generate enhanced color image 17.

Figure 9:
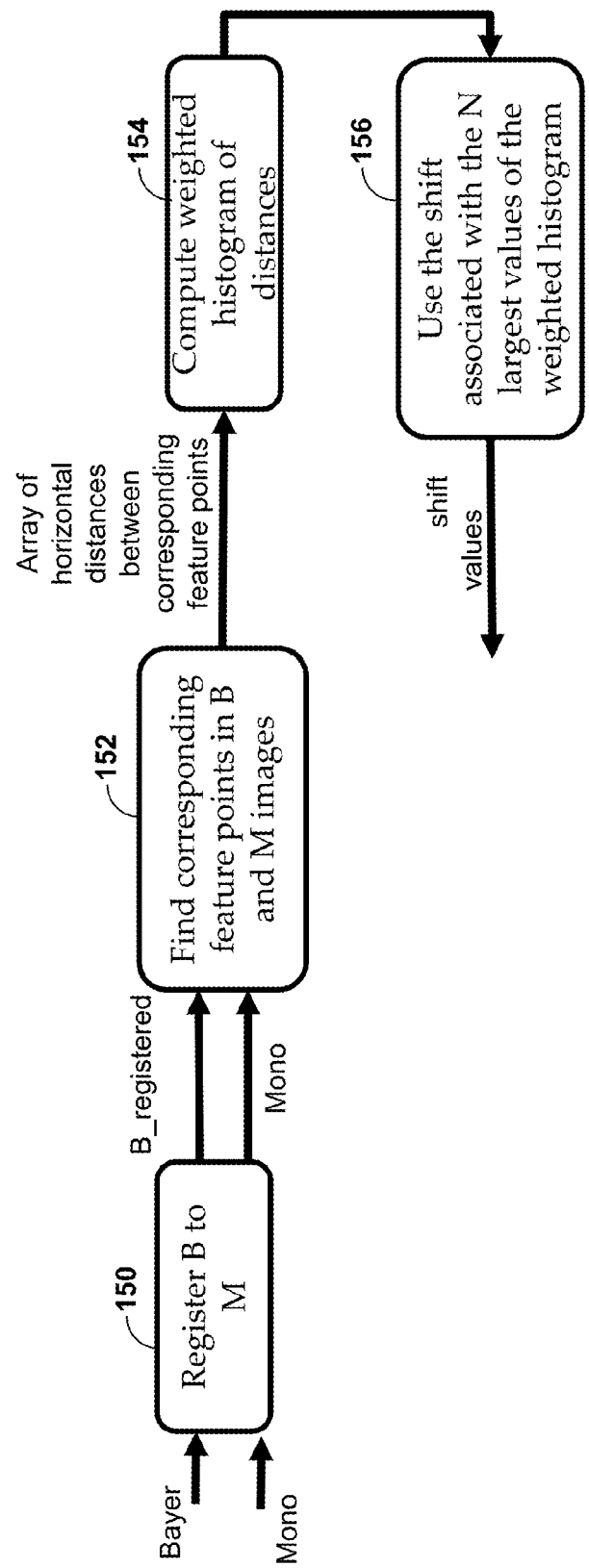
FIG. 9 is a flowchart illustrating exemplary operation of the camera processor shown in FIG. 1 in computing shift values in accordance with various aspects of the techniques described in this disclosure.

FIG. 9 is a flowchart illustrating exemplary operation of camera processor 14 in computing shift values in accordance with various aspects of the techniques described in this disclosure. Camera processor 14 may first register combined color image 15A (B) to combined mono image 15N (M) (150) and determines corresponding feature points in combined color image 15A (B) and combined mono image 15N (M) (152). Camera processor 14 may next compute a weighted histogram of distances and select the shift values associated with some threshold number N largest values of the weighted histogram (154, 156).

In some instances, the number of weights (which may also be referred to as NCC images) that can be computed in practice is limited (e.g., due to processing time). As such, camera processor 14 may only compute N weights by detecting and tracking a sparse set of feature points between registered images 15A and 15N and selecting the modes of the histogram of the horizontal distances between the tracked feature points. In some examples, in order to make sure large shift values are selected, camera processor 14 may compute a weighted histogram where the weight is the value of the shift for that histogram bin.

Figure 10:
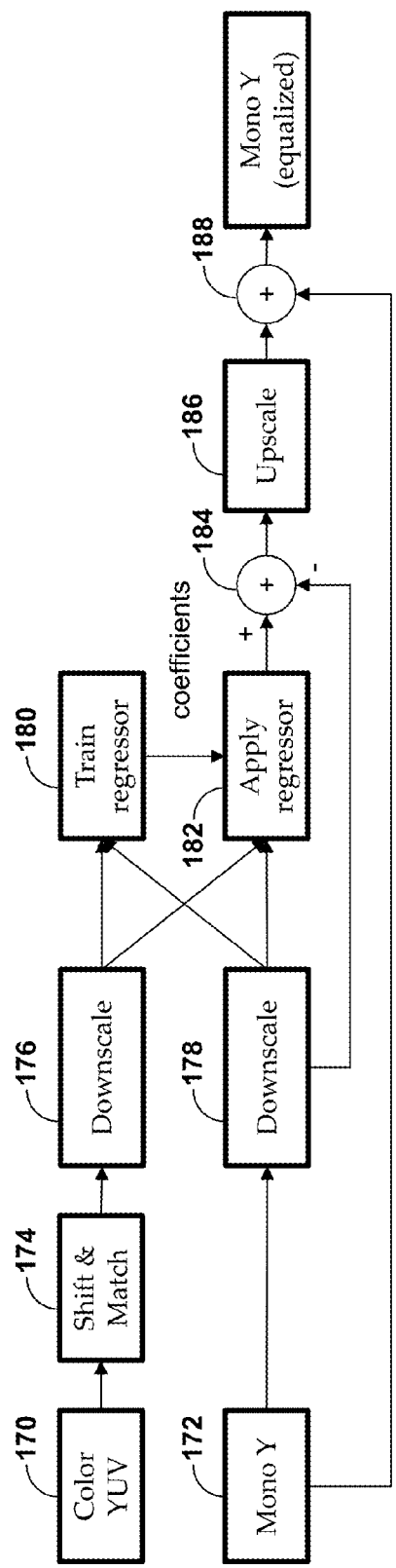
FIG. 10 is a flowchart illustrating exemplary operation of the camera processor shown in FIG. 1 in performing intensity equalization to correct for intensity differences between a color camera and a mono camera in accordance with various aspects of the techniques described in this disclosure.

FIG. 10 is a flowchart illustrating exemplary operation of camera processor 14 in performing intensity equalization to correct for intensity differences between color camera 12A and mono camera 12N in accordance with various aspects of the techniques described in this disclosure. The intensity equalization techniques may be performed in conjunction with the above described color image enhancement techniques or separately from the color image enhancement techniques described above.

In the context of the color image enhancement techniques, intensity equalization may promote better results for the above referenced color image enhancement techniques because removal of the color filter (for mono camera 12N) may create a spatially varying light sensitivity that global exposure compensation would not be able to address. That is, the pattern of the Bayer filter with interweaved filters of different colors generally impacts the light sensitivity depending on which colored filter is at which particular pixel.

Figure 11:
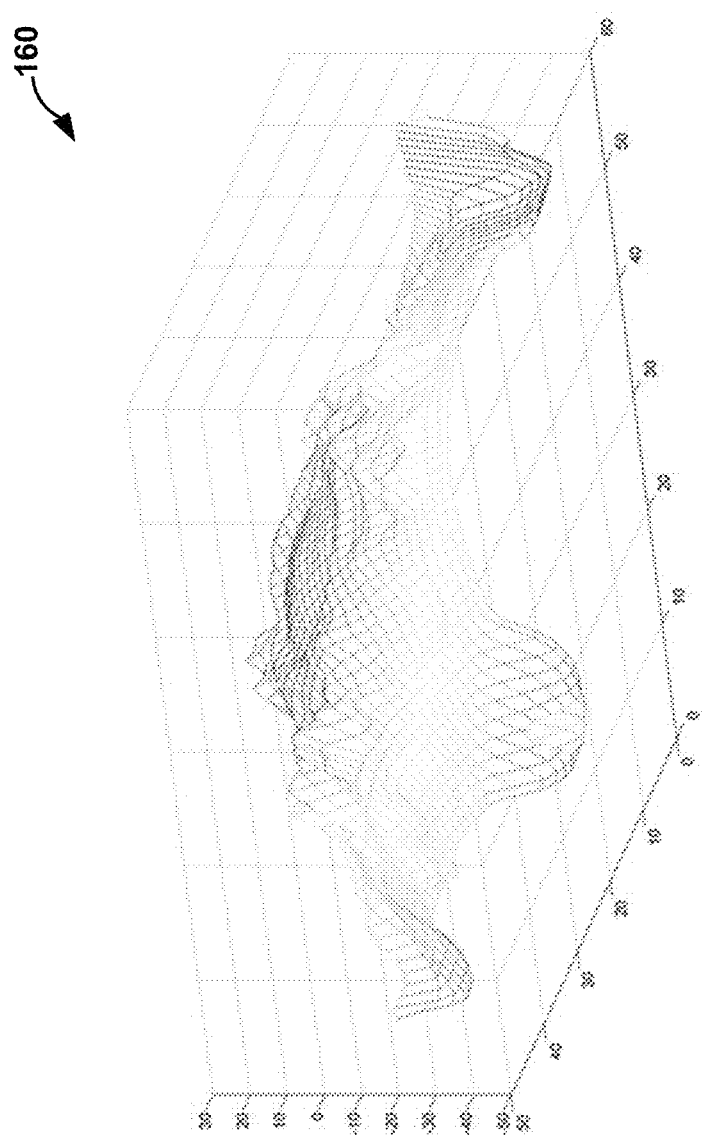
FIG. 11 is a diagram illustrating a graph showing spatially varying light sensitivity as the difference between the light sensitivity of a color camera and a mono camera.

FIG. 11 is a diagram illustrating a graph 160 showing spatially varying light sensitivity as the difference between the light sensitivity of color camera 12A and mono camera 12N. In graph 160, the Z-axis is the difference between the intensity of the luma component of combined color image 15A and combined mono image 15N, while the X- and Y-axis represent pixel position (in the X- and Y-axis respectively). Intensity equalization may attempt to bring the luma component of combined mono image 15N closer to the luma component of combined color image 15A.

However, different image sensors in cameras 12A and 12N may have different light sensitivity to colors. For example, a red object may appear brighter in combined mono image 15N than in combined color image 15A, while a blue object may appear darker in mono image 15N than in combined color image 15A. To overcome this problem, the intensity equalization techniques may employ machine learning as described with respect to the example of FIG. 10.

Returning to the example of FIG. 10, camera processor 14 may generate combined color image 15A and combined mono image 15N and then perform a shift and match operation as described above with respect to the examples of FIGS. 8 and 9 (170-174). Camera processor 14 may next downscale shifted and matched combined color image 15A and combined mono image 15N (176, 178). Downscaling may allow training and application of the regressor to proceed more quickly, given that machine learning involving a regressor may be computationally intensive.

Camera processor 14 may train the regressor based on downscaled combined color image 15A and downscaled combined mono image 15N (180). Regressor training may result in coefficients that camera processor 14 may use to program or otherwise configure the regressor. Training times may be reduced by using a subset of samples (where several thousand samples are generally sufficient). Although shown in FIG. 10 as occurring during any given application of the regressor, camera processor 14 may perform training only once (e.g., during an initial configuration of computing device 10), upon booting up or powering on computing device 10, periodically to configure the regressor, as a result of user initiation, or with any other frequency or in response to any other condition.

After configuring the regressor with the coefficients, camera processor 14 may apply the regressor to downscaled combined color image 15A and downscaled combined mono image 15N (182). The regressor may perform ridge regression (such as Tikhonov regularization) to avoid overfitting. In this example, the regessor is a ridge regressor. The regressor may normalize the luma and chroma components of downscaled combined color image 15A and downscaled combined mono image 15N to values between 0 and 1, while also potentially augmenting features with second order terms.

Camera processor 14 may subtract the downscaled combined mono image 15N from the output of the regressor (184), and next upscale the output of the subtraction (186). Camera processor 14 may generate the equalized mono image by adding the upscaled result of the subtraction to combined mono image 15N (188).

Although described as generating an equalized mono image, the intensity equalization aspect of the techniques described in this disclosure may also be applied to the color image data in a similar manner to generate equalized color image data. As such, camera processor 14 may subtract the downscaled combined color image 15A from the output of the regressor, and next upscale the output of the subtraction.

The camera processor may generate an equalized color image by adding the upscaled result of the subtraction to the combined color image 15A.

Figure 12:
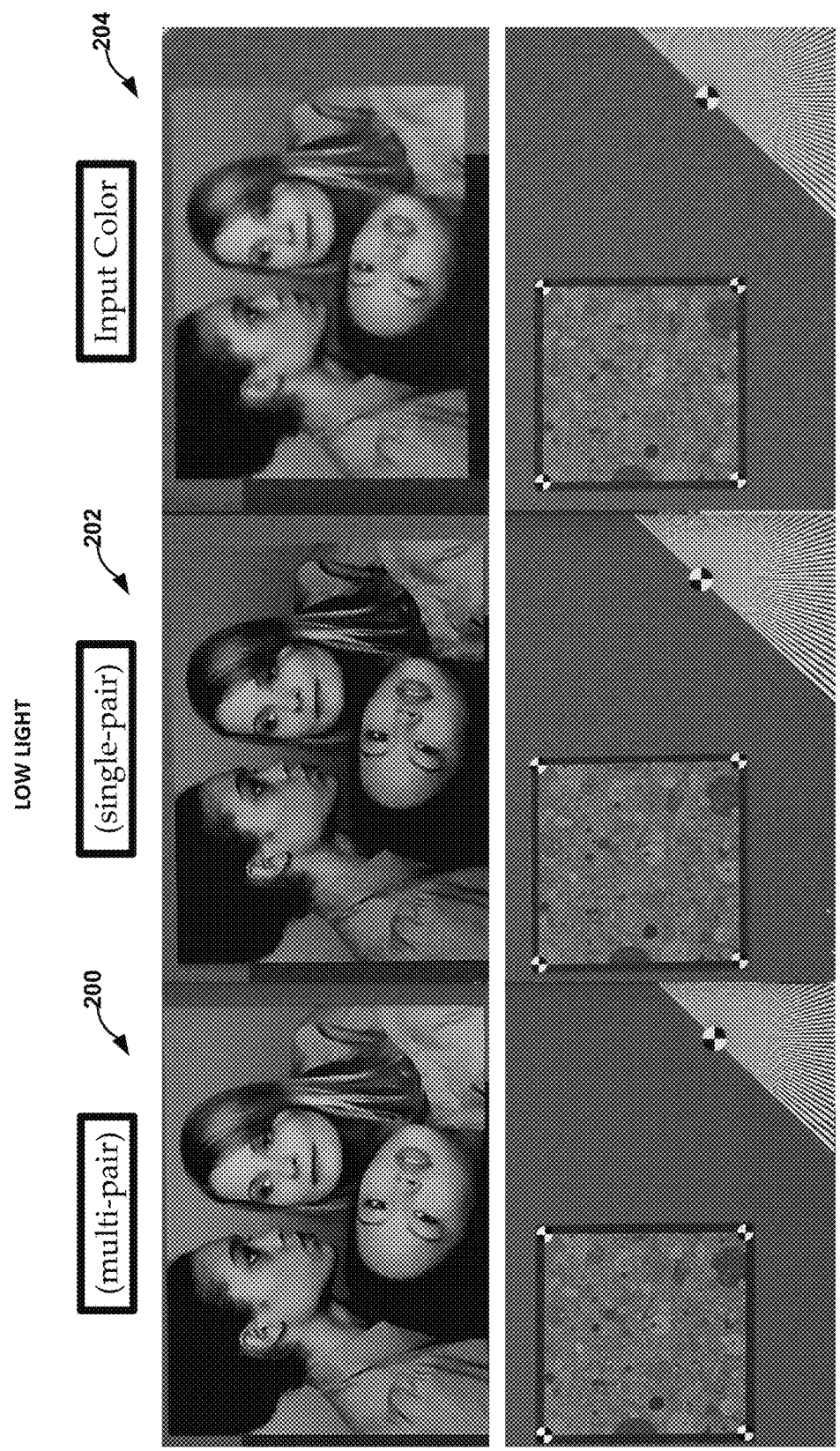
FIG. 12-16 are diagrams illustrating example results of color image enhancement and intensity equalization techniques described in this disclosure.

FIG. 12-16 are diagrams illustrating the results of the color image enhancement and intensity equalization techniques described in this disclosure. In the example of FIG. 12, computing device 10 may generate, in low light conditions (e.g., approximately 20 LUX), enhanced color image 200 (which may represent one example of enhanced color image 17) based on combined color image 15A and combined mono image 15N. Computing device 10 may generate, in low light conditions (e.g., approximately 20 LUX), enhanced color image 202 (which may represent one example of enhanced color image 17) based on a single color image 13A and a single mono image 13N. Color image 204 is provided for purposes of comparison and represents single color image 13A captured in low light conditions.

Figure 13:
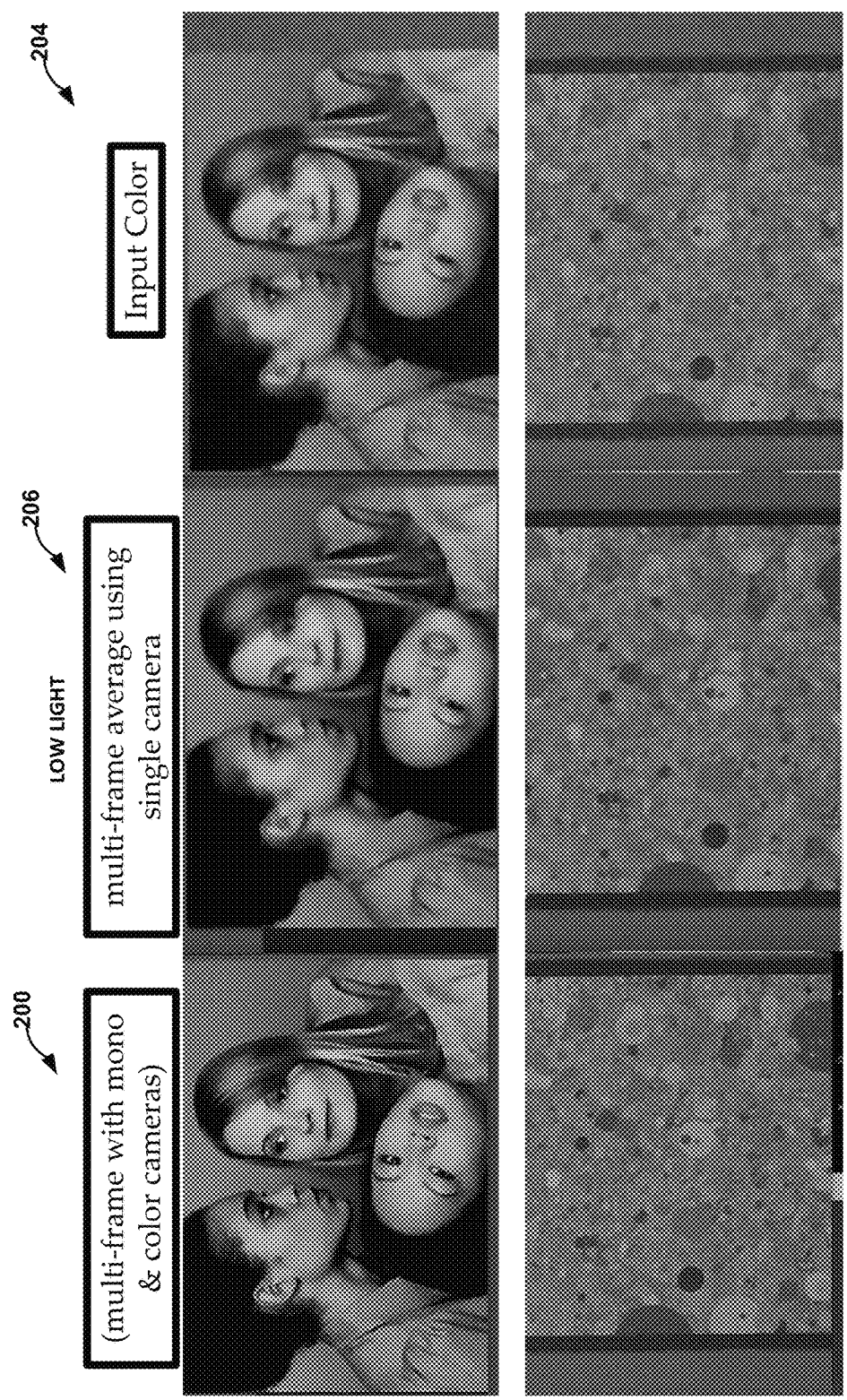

In the example of FIG. 13, computing device 10 may generate, in low light conditions (e.g., approximately 20 LUX), enhanced color image 200 (which may represent one example of enhanced color image 17) based on combined color image 15A and combined mono image 15N. Color image 206 is provided for purposes of comparison and represents combined color image 15A captured in low light conditions. Color image 204 is provided for purposes of comparison and represents single color image 13A captured in low light conditions.

Figure 14:

In the example of FIG. 14, computing device 10 may generate, in low light conditions (e.g., approximately 20 LUX), enhanced color image 200 (which may represent one example of enhanced color image 17) based on combined color image 15A and combined mono image 15N. Computing device 10 may generate, in low light conditions (e.g., approximately 20 LUX), enhanced color image 202 (which may represent one example of enhanced color image 17) based on a single color image 13A and a single mono image 13N. Color image 208 is provided for purposes of comparison and represents a color image captured in low light conditions that was processed using a high dynamic range (HDR) process. Color image 210 is provided for purposes of comparison and represents a color image captured in low light conditions that was processed using an optical image stabilization (OIS) process.

Figure 15:
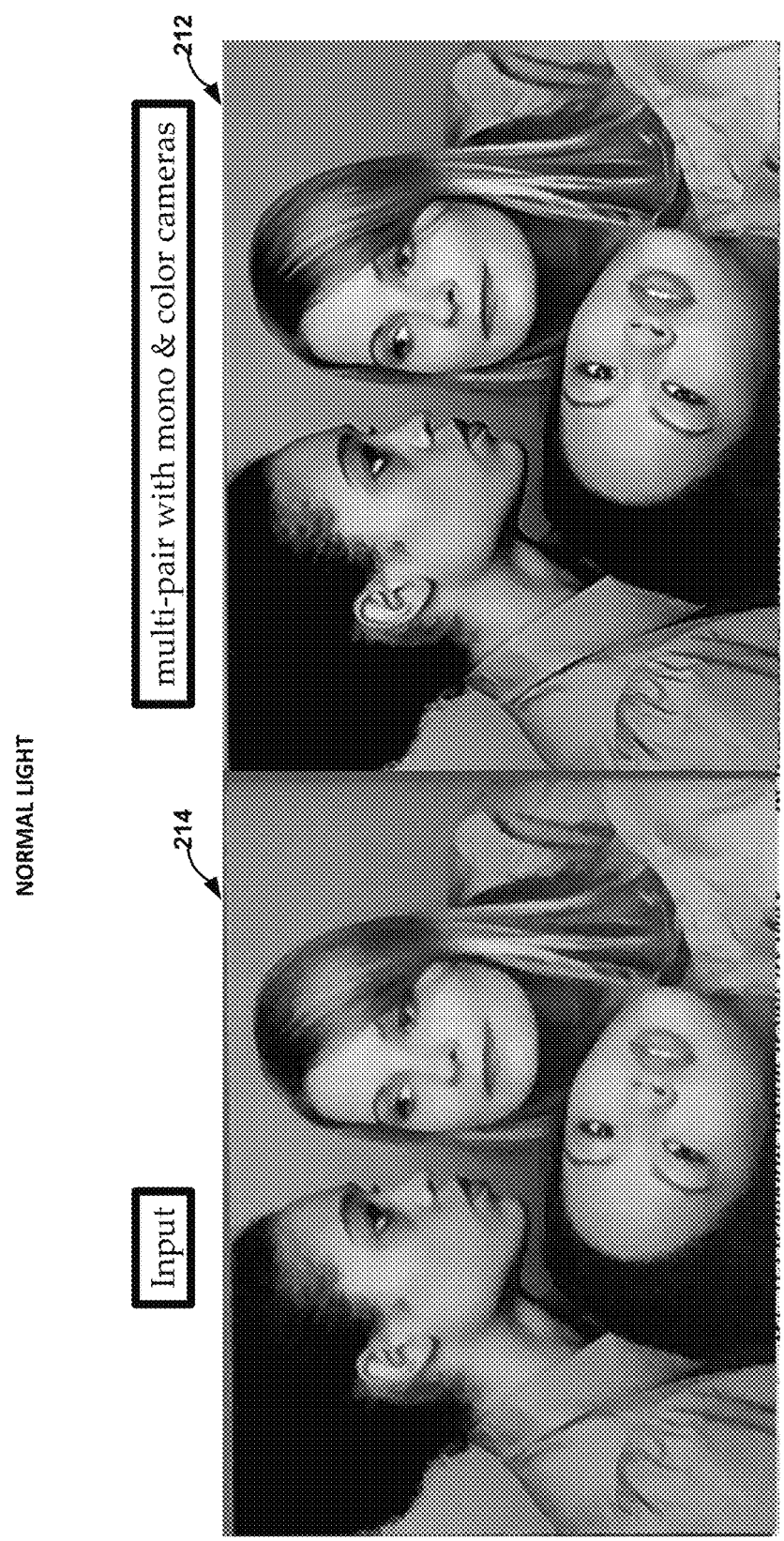

In the example of FIG. 15, computing device 10 may generate enhanced color image 212 (which may represent one example of enhanced color image 17) based on combined color image 15A and combined mono image 15N captured in normal light conditions (e.g., ~700 LUX). Color image 214 is provided for purposes of comparison and represents an example of single color image 13A captured in normal light conditions.

Figure 16:
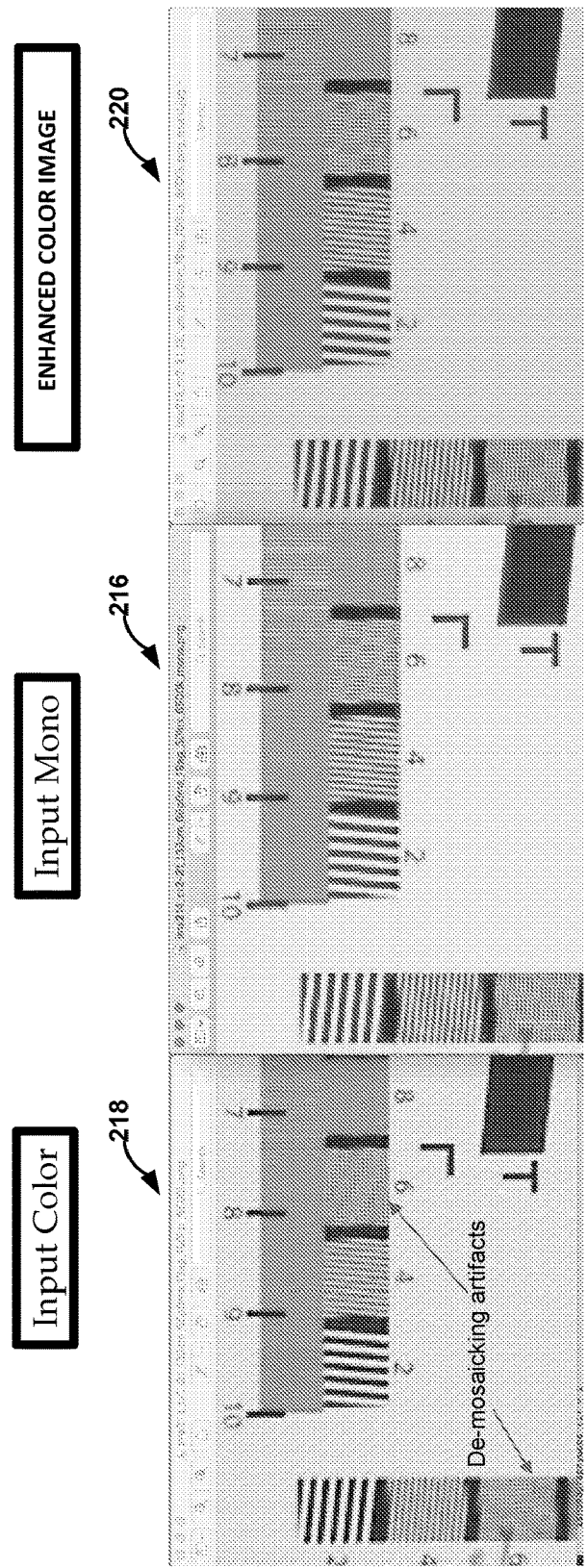

In the example of FIG. 16, computing device 10 may generate enhanced color image 216 (which may represent one example of enhanced color image 17) based on combined color image 15A and combined mono image 15N. Color image 218 is provided for purposes of comparison and represents single color image 13A. Mono image 220 is provided for purposes of comparison and represent single mono image 13N. As can be seen by comparing color image 218 with enhanced color image 220, the techniques may also potentially improve demosaicing artifacts.

Figure 17:
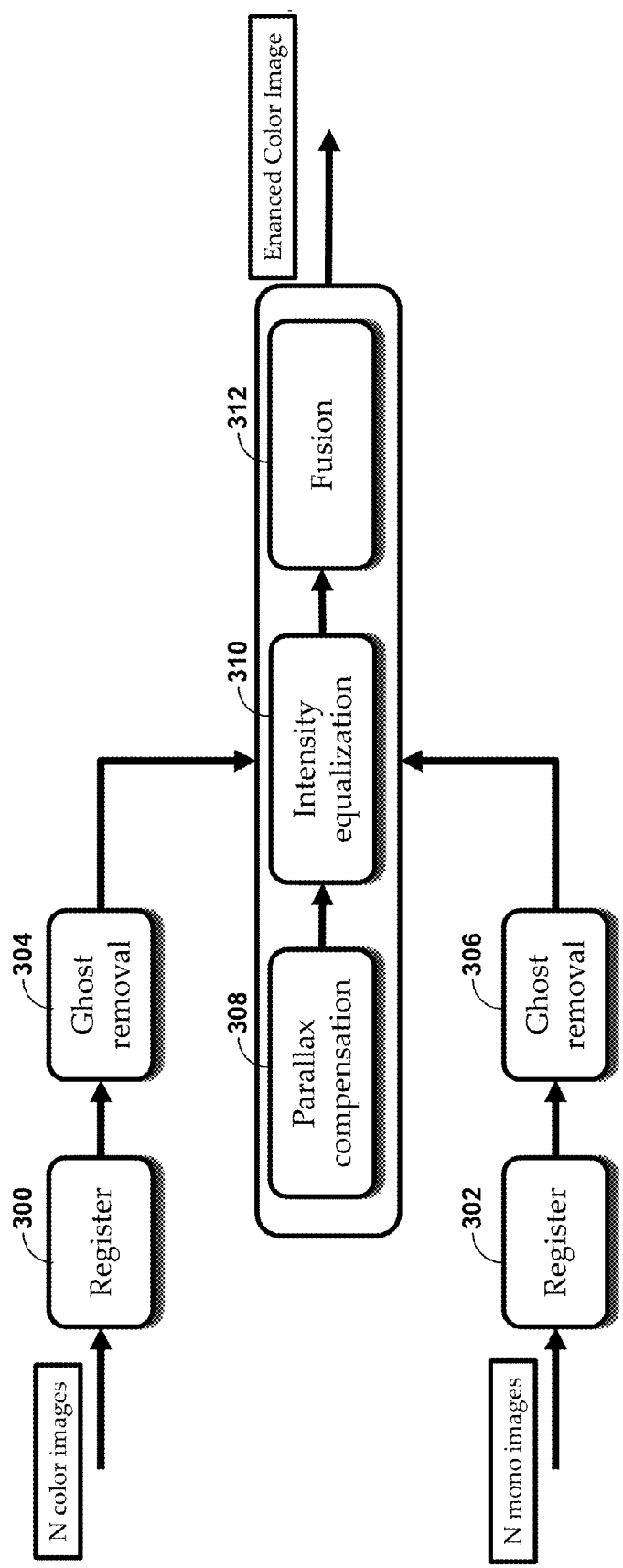
FIG. 17 is a flowchart illustrating exemplary operation of the device shown in FIG. 1 in performing both the color image enhancement aspects and the intensity equalization aspects of the techniques described in this disclosure.

FIG. 17 is a flowchart illustrating exemplary operation of computing device 10 in performing both the color image enhancement aspects and the intensity equalization aspects of the techniques. As shown in the example of FIG. 17, camera processor 14 may register N color images and N mono images (300, 302). However, camera processor 14 may also perform some additional steps, such as ghost removal, with respect to the registered color images and registered mono images (304, 306). Otherwise, camera processor 14 may perform the intensity equalization aspects of the techniques between the parallax compensation portion of the color enhancement aspects of the techniques described in more detail above and the fusion portions of the color enhancement aspects of the techniques in more detail above (308-312) to output an enhanced color image.

Figure 18:
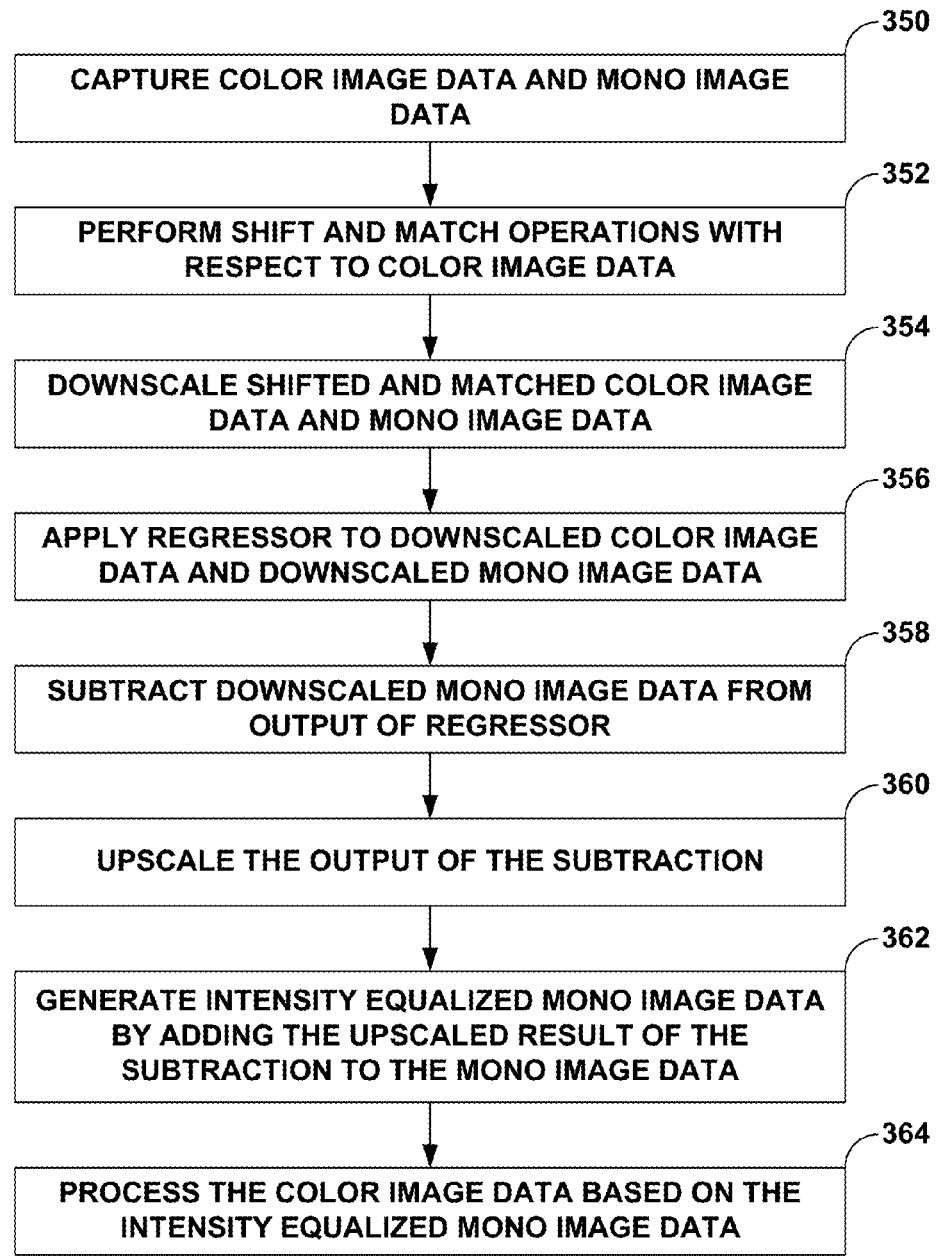
FIG. 18 is another flowchart illustrating exemplary operation of the computing device shown in FIG. 1 in performing intensity equalization aspects of the techniques described in this disclosure.

FIG. 18 is another flowchart illustrating exemplary operation of computing device 10 in performing intensity equalization aspects of the techniques described in this disclosure. The intensity equalization techniques may be performed in conjunction with the above described color image enhancement techniques or separately from the color image enhancement techniques described above.

Camera processor 14 may interface with color camera 12A to capture color image data 15A and with mono camera 12N to capture mono image data 15N (350). Camera processor 14 may next perform shift and match operations operation (as described above with respect to the examples of FIGS. 8 and 9) with respect to color image data 15A (352). Camera processor 14 may next downscale shifted and matched color image 15A (or alternatively combined color image 15A when multiple color images are captured) and mono image 15N (or alternatively combined mono image 15N when multiple mono images are captured) (354).

Camera processor 14 may train a regressor based on downscaled combined color image 15A and downscaled combined mono image 15N. Alternatively, the regressor may be trained by a different computing device or pre-trained and installed on computing device 10. Regressor training may result in coefficients that camera processor 14 may use to program or otherwise configure the regressor. Training times may be reduced by using a subset of samples (where several thousand samples are generally sufficient). As described above, camera processor 14 may perform training only once (e.g., during an initial configuration of computing device 10), upon booting up or powering on computing device 10, periodically to configure the regressor, as a result of user initiation, or with any other frequency or in response to any other condition.

Camera processor 14 may apply the regressor to downscaled combined color image 15A and downscaled combined mono image 15N (356). The regressor may normalize the luma and chroma components of downscaled combined color image 15A and downscaled combined mono image 15N to values between 0 and 1, while also potentially augmenting features with second order terms.

Camera processor 14 may subtract the downscaled combined mono image 15A from the output of the regressor (358), and next upscale the output of the subtraction (360). Camera processor 14 may generate the intensity equalized mono image by adding the upscaled result of the subtraction to mono image 15N (362). Given that the mono image data 12N only includes a luma component, intensity equalization may also be described as being performed with respect to the luma component of the mono image data 12N. In any event, camera processor 14 may next process the color image data based on the intensity equalized mono image data 12N (364).

Figure 19:
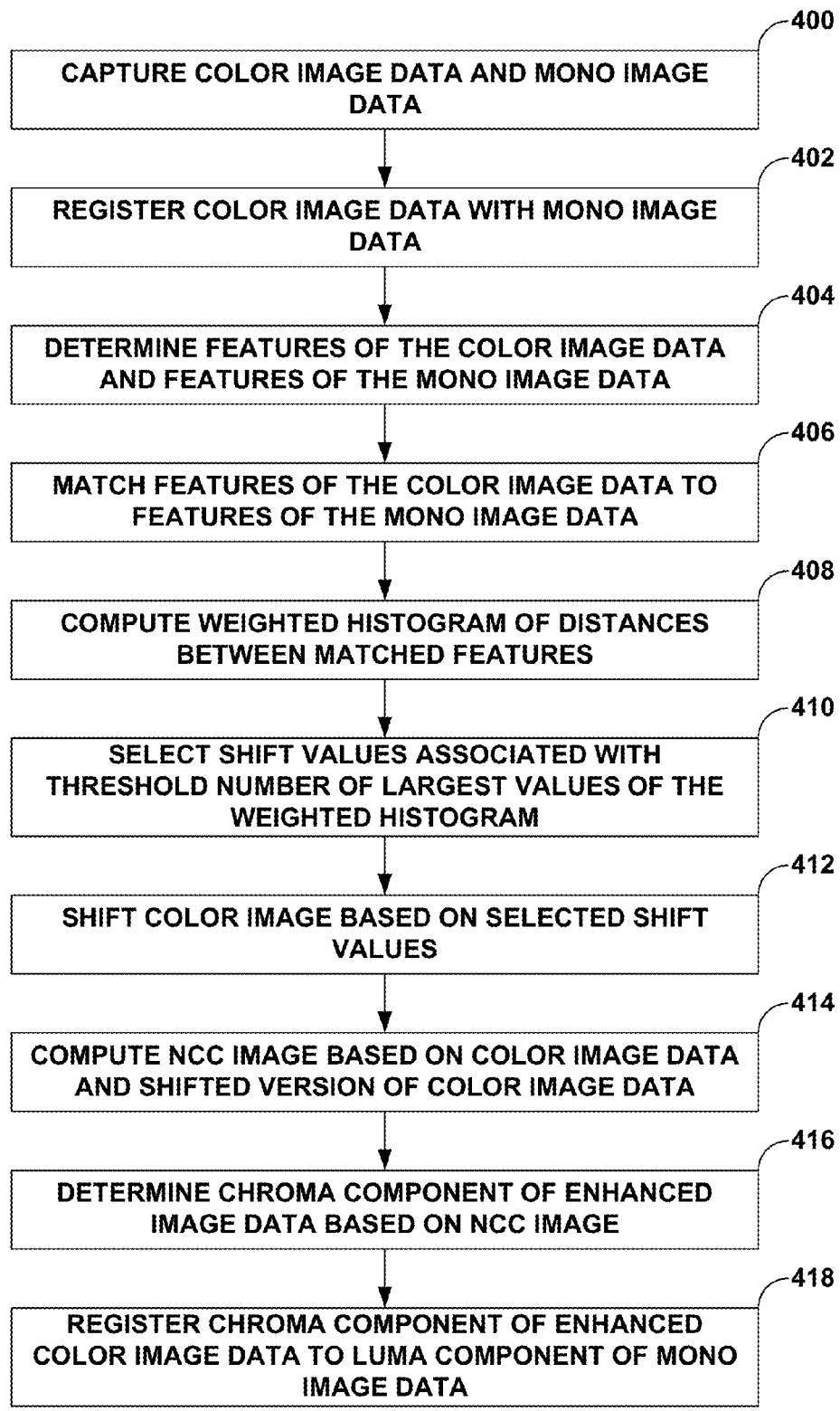
FIG. 19 is another flowchart illustrating exemplary operation of the device shown in FIG. 1 in performing shift-and-match fusion in accordance with various aspects of the techniques described in this disclosure.

FIG. 19 is another flowchart illustrating exemplary operation of the camera processor in performing shift-and-match fusion in accordance with various aspects of the techniques described in this disclosure. As shown in the example of FIG. 19, camera processor 14 may interface with color camera 12A to capture a color image data 15A, and with mono camera 12N to capture mono image data 15N (400). Camera processor 14 may next register color image data 15A to mono image data 15N (402).

After registering color image data 15A with mono image data 15N, camera processor 14 may determine features of the color image data and features of the mono image data (404). Camera processor 14 may match the features of color image data 15A to the features of mono image data 15N (406). Camera processor 14 may next compute a weighted histogram of distances between the matched features and select shift values associated with some threshold number N largest values of the weighted histogram (408, 410). Camera processor 14 may output the shift values as an array of shift values, each shift value specified to shift a variable (x) number of pixels horizontally.

Camera processor 14 may shift registered combined color image data 15A based on shift values (412) and compute an NCC image in the manner described above based on combined color image data 15A and the shifted version of combined color image data 15A (414). Next, camera processor 14 may determine the chroma component (which are denoted as "U" and "V" in the YUV color space) of enhanced color image 17 based on the NCC image in accordance with the above noted equations (416). Camera processor 14 may register the chroma component of enhanced color image 17 to the luma component of combined mono image 15N to generate the fused image (which is another way by which to refer to enhanced color image 17) (418).

Figure 20:
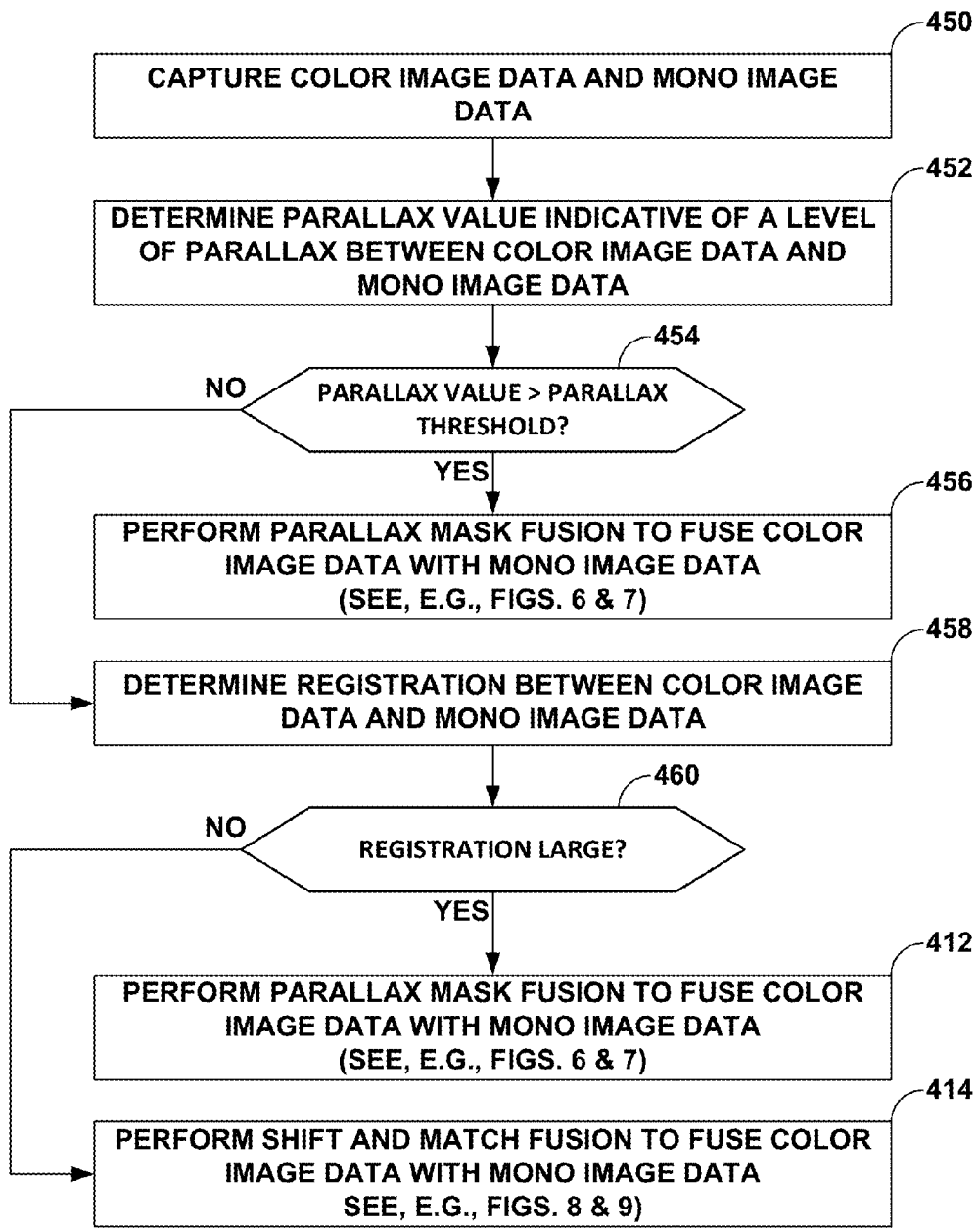
FIG. 20 is a flowchart illustrating exemplary operation of the device shown in FIG. 1 in performing macrophotography processing of color image data in accordance with various aspects of the techniques described in this disclosure.

FIG. 20 is a flowchart illustrating exemplary operation of camera processor 14 in performing macrophotography processing of color image data in accordance with various aspects of the techniques described in this disclosure. In the example of FIG. 20, camera processor 14 may first interface with color camera 12A to capture a color image data 15A, and with mono camera 12N to capture mono image data 15N (450). Camera processor 14 may next determine a parallax value indicative of a level of parallax between mono image data 15N and color image data 15A in any of the various ways described in more detail above (452).

Camera processor 14 may next determine whether the scene was captured using macrophotography based on the determined parallax value. Camera processor 14 may determine whether the scene was captured using macrophotography when the parallax value is greater than a parallax threshold (e.g., when five percent of the disparities between the horizontally matching histograms are above the parallax threshold) (454). In response to the determination that the scene was captured using macrophotography ("YES" 454), camera processor 14 may process combined color image 15A by performing the parallax mask fusion (456) to fuse (or, in other words, combine) the color image data with the mono image data to generate the enhance color image data, which is described in more detail with respect to the examples of FIGS. 6 and 7.

In response to the determination that the scene was not captured using macrophotography (or, in other words, that the parallax value is not greater than the parallax threshold; "NO" 454), camera processor 14 may next determine whether registration was large (meaning there was a large shift, e.g., in x and/or y dimensions, to match up features during registration of combined mono image data 15N with combined color image data 15A) (458). When registration was large ("YES" 460), camera processor 14 may process combined color image 15A by performing the parallax mask fusion to fuse (or, in other words, combine) the color image data with the mono image data to generate the enhance color image data (462). When registration is not large ("NO" 460), camera processor 14 may process combined color image 15A by performing the shift-and-match fusion to fuse (or, in other words, combine) the color image data with the mono image data to generate the enhance color image data, which is described in more detail with respect to the examples of FIGS. 8 and 9 (464).

The techniques may, in this way, leverage the higher signal-to-noise ratio (SNR) and resolution of the mono image (as a result of not having a color filter) to create a better (in terms of clarity, artifacts, and/or noise) fused image. Moreover, the techniques, due to machine learning-based intensity equalization, may avoid factory calibration to account for intensity differences (which may save costs). Furthermore, the techniques may promote additional cost savings as the resolution of the color camera can be selected to be less than the resolution of the mono camera.

In one or more examples, the functions described may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of capturing color image data, the method comprising:
    capturing, by a monochrome camera of a device, monochrome image data of a scene;
    capturing, by a color camera of the device, color image data of the scene, the color image data including spatially varying light sensitivity in a luma component;
    performing, by a processor of the device and based on a spatial location of the luma component of the color image data, intensity equalization with respect to the luma component of the color image data or a luma component of the monochrome image data to correct for spatially varying differences in intensity between the color camera and the monochrome camera;
    determining, by the processor, whether a parallax value is greater than a parallax threshold, wherein the parallax value is indicative of a level of parallax between the monochrome image data and the color image data; and
    in response to a determination that the parallax value is greater than the parallax threshold, combining, by the processor and after performing the intensity equalization, the luma component of the color image data with the luma component of the monochrome image data to generate a luma component of enhanced color image data.

2. The method of claim 1, further comprising processing, after performing the intensity equalization, the color image data based on the monochrome image data to generate the enhanced color image data.

3. The method of claim 2, wherein processing the color image data comprises processing the color image data based at least in part on the parallax value.

4. The method of claim 2, wherein processing the color image data comprises:
    determining the parallax value; and
    processing, based on the determined parallax value, the color image data to generate the enhanced color image data.

5. The method of claim 4, wherein processing the color image data comprises:
    determining that the parallax value is greater than the parallax threshold;
    computing, in response to the determination that the parallax value is greater than the parallax threshold, a parallax mask based on the luma component of the color image data and the luma component of the monochrome image data; and
    combining, based on the parallax mask, the luma component of the color image data with the luma component of the monochrome image data to generate the luma component of the enhanced color image data.

6. The method of claim 4, wherein the method further comprises:
    determining that the parallax value is greater than the parallax threshold, and
    wherein performing the intensity equalization comprises equalizing, in response to the determination that the parallax value is greater than the parallax threshold, the luma component of either the monochrome image data or the color image data.

7. The method of claim 6, wherein processing the color image data comprises:
    computing a parallax mask based on the luma component of the color image data and the luma component of the monochrome image data; and
    combining, based on the parallax mask and after equalizing the luma component of either the monochrome image data or the color image data, the luma component of the color image data with the luma component of the monochrome image data to generate the luma component of the enhanced color image data.

8. The method of claim 2,
    wherein capturing the monochrome image data comprises capturing two or more different monochrome image data over a period of time,
    wherein the method further comprises processing the two or more different monochrome image data to generate a single combined monochrome image data, and
    wherein processing the color image data comprises processing the color image data based on the single combined monochrome image data to generate the enhanced color image data.

9. The method of claim 2,
    wherein capturing the color image data comprises capturing two or more sets of color image data over a period of time,
    wherein the method further comprises processing the two or more different color image data to generate a single combined color image data, and
    wherein processing the color image data comprises processing the single combined color image data based on the monochrome image data to generate the enhanced color image data.

10. The method of claim 2,
    wherein capturing the monochrome image data comprises capturing two or more different monochrome image data over a period of time,
    wherein capturing the color image data comprises capturing two or more sets of color image data over the period of time, and
    wherein the method further comprises:
    processing the two or more different monochrome image data to generate a single combined monochrome image data; and
    processing the two or more different color image data to generate a single combined color image data, and
    wherein processing the color image data comprises processing the single combined color image data based on the single combined monochrome image data to generate the enhanced color image data.

11. The method of claim 1, wherein capturing the color image data comprises capturing the color image data of the scene concurrent with the capture of the monochrome image data.

12. The method of claim 1, wherein performing intensity equalization comprises:
    training a regressor to account for spatially varying light sensitivity of the color camera as a result of the color camera using one or more filters to capture the luma component of the color image data; and
    applying the trained regressor to the luma component of the color image data or the shifted color image data and the luma component of the monochrome image data to adapt the luma component of the monochrome image data or the luma component of the color image data.

13. The method of claim 12, wherein the regressor comprises a ridge regressor.

14. The method of claim 12, wherein the regressor is trained using Tikhonov regularization to avoid overfitting.

15. A device configured to capture color image data, the device comprising:
a monochrome camera configured to capture monochrome image data of a scene;
a color camera configured to capture color image data of the scene, the color image data including spatially varying light sensitivity in a luma component; and
a processor configured to:
perform, based on a spatial location of the luma component of the color image data, intensity equalization with respect to the luma component of the color image data or a luma component of the monochrome image data to correct for spatially varying differences in intensity between the color camera and the monochrome camera;
determine whether a parallax value is greater than a parallax threshold, wherein the parallax value is indicative of a level of parallax between the monochrome image data and the color image data; and
in response to a determination that the parallax value is greater than the parallax threshold, combining, after performing the intensity equalization, the luma component of the color image data with the luma component of the monochrome image data to generate a luma component of enhanced color image data.

16. The device of claim 15, wherein the processor is further configured to process, after performing the intensity equalization, the color image data based on the monochrome image data to generate the enhanced color image data.

17. The device of claim 16, wherein the processor is configured to process the color image data based at least in part on the parallax value.

18. The device of claim 16, wherein the processor is configured to:
determine the parallax value; and
process, based on the determined parallax value, the color image data to generate the enhanced color image data.

19. The device of claim 18, wherein the processor is configured to:
determine that the parallax value is greater than the parallax threshold;
compute, in response to the determination that the parallax value is greater than the parallax threshold, a parallax mask based on the luma component of the color image data and the luma component of the monochrome image data; and
combine, based on the parallax mask, the luma component of the color image data with the luma component of the monochrome image data to generate the luma component of the enhanced color image data.

20. The device of claim 18, wherein the processor is further configured to determine that the parallax value is greater than the parallax threshold, and
wherein the processor is configured to equalize, in response to the determination that the parallax is greater than the parallax threshold, the luma component of either the monochrome image data or the color image data.

21. The device of claim 20, wherein the processor is configured to:
compute a parallax mask based on the luma component of the color image data and the luma component of the monochrome image data; and
combine, based on the parallax mask and after equalizing the luma component of either the monochrome image data or the color image data, the luma component of the color image data with the luma component of the monochrome image data to generate the luma component of the enhanced color image data.

22. The device of claim 16,
wherein the monochrome camera is configured to capture two or more different monochrome image data over a period of time,
wherein the processor is further configured to process the two or more different monochrome image data to generate a single combined monochrome image data, and
wherein the processor is configured to process the color image data based on the single combined monochrome image data to generate the enhanced color image data.

23. The device of claim 16,
wherein the color camera is configured to capture two or more sets of color image data over a period of time,
wherein the processor is further configured to process the two or more different color image data to generate a single combined color image data, and
wherein the processor is configured to process the single combined color image data based on the monochrome image data to generate the enhanced color image data.

24. The device of claim 16,
wherein the monochrome camera is configured to capture two or more different monochrome image data over a period of time,
wherein the color camera is configured to capture two or more sets of color image data over the period of time, and
wherein the processor is further configured to:
process the two or more different monochrome image data to generate a single combined monochrome image data; and
process the two or more different color image data to generate a single combined color image data, and
wherein the processor is configured to process the single combined color image data based on the single combined monochrome image data to generate the enhanced color image data.

25. The device of claim 15, wherein the color camera is configured to capture the color image data of the scene concurrent with the capture of the monochrome image data.

26. The device of claim 15, wherein the processor is configured to:
train a ridge regressor to account for spatially varying light sensitivity of the color camera as a result of the color camera using one or more filters to capture the luma component of the color image data; and
apply the trained ridge regressor to the luma component of the color image data or the shifted color image data and the luma component of the monochrome image data to adapt the luma component of the monochrome image data or the luma component of the color image data.

27. A device configured to capture color image data, the device comprising:
means for capturing monochrome image data of a scene;
means for capturing color image data of the scene, the color image data including spatially varying light sensitivity in a luma component;

means for performing, based on a spatial location of the luma component of the color image data, intensity equalization with respect to the luma component of the color image data or a luma component of the monochrome image data to correct for spatially varying differences in intensity between the means for capturing the color image data and the means for capturing the monochrome image data;

means for determining whether a parallax value is greater than a parallax threshold, wherein the parallax value is indicative of a level of parallax between the monochrome image data and the color image data; and in response to a determination that the parallax value is greater than the parallax threshold, means for combining, after performing the intensity equalization, the luma component of the color image data with the luma component of the monochrome image data to generate a luma component of enhanced color image data.

28. A non-transitory computer-readable storage medium having stored thereon instructions that, when executed, cause one or more processors to:

interface with a monochrome camera to initiate capture of monochrome image data of a scene;

interface with a color camera to initiate capture of color image data of the scene, the color image data including spatially varying light sensitivity in a luma component;

perform, based on a spatial location of the luma component of the color image data, intensity equalization with respect to the luma component of the color image data or a luma component of the monochrome image data to correct for spatially varying differences in intensity between the color camera and the monochrome camera;

determine whether a parallax value is greater than a parallax threshold, wherein the parallax value is indicative of a level of parallax between the monochrome image data and the color image data; and in response to a determination that the parallax value is greater than the parallax threshold, combine, after performing the intensity equalization, the luma component of the color image data with the luma component of the monochrome image data to generate a luma component of enhanced color image data.

* * * * *